(12) United States Patent
Deliwala

(10) Patent No.: US 12,347,398 B2
(45) Date of Patent: *Jul. 1, 2025

(54) ENHANCED PUSH-PULL (EPP) WAVEFORMS FOR ACHIEVING PRIMARY COLOR SETS IN MULTI-COLOR ELECTROPHORETIC DISPLAYS

(71) Applicant: E Ink Corporation, Billerica, MA (US)

(72) Inventor: Amit Deliwala, Andover, MA (US)

(73) Assignee: E Ink Corporation, Billerica, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/805,841

(22) Filed: Aug. 15, 2024

(65) Prior Publication Data

US 2024/0404483 A1 Dec. 5, 2024

Related U.S. Application Data

(63) Continuation of application No. 18/369,991, filed on Sep. 19, 2023, now Pat. No. 12,087,244, which is a
(Continued)

(51) Int. Cl.
G09G 3/34 (2006.01)
G02F 1/167 (2019.01)
(Continued)

(52) U.S. Cl.
CPC ............ *G09G 3/344* (2013.01); *G02F 1/167* (2013.01); *G02F 1/1679* (2019.01);
(Continued)

(58) Field of Classification Search
CPC .......... G09G 3/344; G09G 2320/0209; G09G 2320/0242; G09G 3/2003; G09G 2310/06; G02F 1/167; G02F 1/1679; G02F 1/1685; G02F 2001/1678; G02F 2201/126; G06N 3/044

See application file for complete search history.

(56) References Cited

U.S. PATENT DOCUMENTS 4,418,346 A 11/1983 Batchelder
5,684,501 A 11/1997 Knapp
(Continued)

FOREIGN PATENT DOCUMENTS

JP 2013250540 A 5/2017

OTHER PUBLICATIONS

Kitamura, T. et al., "Electrical toner movement for electronic paper-like display", Asia Display/IDW '01, pp. 1517-1520, Paper HCS1-1 (2001).
(Continued)

*Primary Examiner* — Antonio Xavier
(74) *Attorney, Agent, or Firm* — Rajesh Vallabh

(57) ABSTRACT

Enhanced push pull driving waveforms for driving a four particle electrophoretic medium including four different types of particles, for example a set of scattering particles and three sets of subtractive particles. Methods for identifying a preferred waveform for a target color state when using a voltage driver having at least five different voltage levels.

15 Claims, 15 Drawing Sheets
(4 of 15 Drawing Sheet(s) Filed in Color)

Related U.S. Application Data continuation of application No. 18/115,129, filed on Feb. 28, 2023, now Pat. No. 11,798,506, which is a continuation of application No. 17/515,838, filed on Nov. 1, 2021, now Pat. No. 11,620,959.

(60) Provisional application No. 63/108,521, filed on Nov. 2, 2020.

(51) Int. Cl.
*G02F 1/1679* (2019.01)
*G02F 1/1685* (2019.01)

(52) U.S. Cl.
CPC ... *G02F 1/1685* (2019.01); *G09G 2320/0209* (2013.01); *G09G 2320/0242* (2013.01)

(56) References Cited

U.S. PATENT DOCUMENTS

| | | | |
|---|---|---|---|
| 5,872,552 A | 2/1999 | Gordon, II et al. | |
| 5,930,026 A | 7/1999 | Jacobson | |
| 6,017,584 A | 1/2000 | Albert et al. | |
| 6,130,774 A | 10/2000 | Albert et al. | |
| 6,144,361 A | 11/2000 | Gordon, II et al. | |
| 6,184,856 B1 | 2/2001 | Gordon, II et al. | |
| 6,225,971 B1 | 5/2001 | Gordon, II et al. | |
| 6,241,921 B1 | 6/2001 | Jacobson et al. | |
| 6,271,823 B1 | 8/2001 | Gordon, II et al. | |
| 6,445,489 B1 | 9/2002 | Jacobson et al. | |
| 6,504,524 B1 | 1/2003 | Gates et al. | |
| 6,512,354 B2 | 1/2003 | Jacobson et al. | |
| 6,531,997 B1 | 3/2003 | Gates et al. | |
| 6,545,797 B2 | 4/2003 | Chen et al. | |
| 6,664,944 B1 | 12/2003 | Albert et al. | |
| 6,672,921 B1 | 1/2004 | Liang et al. | |
| 6,753,999 B2 | 6/2004 | Zehner et al. | |
| 6,788,449 B2 | 9/2004 | Liang et al. | |
| 6,788,452 B2 | 9/2004 | Liang et al. | |
| 6,825,970 B2 | 11/2004 | Goenaga et al. | |
| 6,900,851 B2 | 5/2005 | Morrison et al. | |
| 6,922,276 B2 | 7/2005 | Zhang et al. | |
| 6,982,178 B2 | 1/2006 | LeCain et al. | |
| 6,995,550 B2 | 2/2006 | Jacobson et al. | |
| 7,002,728 B2 | 2/2006 | Pullen et al. | |
| 7,012,600 B2 | 3/2006 | Zehner et al. | |
| 7,023,420 B2 | 4/2006 | Comiskey et al. | |
| 7,034,783 B2 | 4/2006 | Gates et al. | |
| 7,038,656 B2 | 5/2006 | Liang et al. | |
| 7,038,670 B2 | 5/2006 | Liang et al. | |
| 7,046,228 B2 | 5/2006 | Liang et al. | |
| 7,052,571 B2 | 5/2006 | Wang et al. | |
| 7,061,166 B2 | 6/2006 | Kuniyasu | |
| 7,061,662 B2 | 6/2006 | Chung et al. | |
| 7,072,095 B2 | 7/2006 | Liang et al. | |
| 7,075,502 B1 | 7/2006 | Drzaic et al. | |
| 7,116,318 B2 | 10/2006 | Amundson et al. | |
| 7,116,466 B2 | 10/2006 | Whitesides et al. | |
| 7,119,772 B2 | 10/2006 | Amundson et al. | |
| 7,144,942 B2 | 12/2006 | Zang et al. | |
| 7,167,155 B1 | 1/2007 | Albert et al. | |
| 7,170,670 B2 | 1/2007 | Webber | |
| 7,177,066 B2 | 2/2007 | Chung et al. | |
| 7,193,625 B2 | 3/2007 | Danner et al. | |
| 7,202,847 B2 | 4/2007 | Gates | |
| 7,230,604 B2 | 6/2007 | Machida et al. | |
| 7,236,291 B2 | 6/2007 | Kaga et al. | |
| 7,259,744 B2 | 8/2007 | Arango et al. | |
| 7,312,784 B2 | 12/2007 | Baucom et al. | |
| 7,321,459 B2 | 1/2008 | Masuda et al. | |
| 7,327,511 B2 | 2/2008 | Whitesides et al. | |
| 7,339,715 B2 | 3/2008 | Webber et al. | |
| 7,385,751 B2 | 6/2008 | Chen et al. | |
| 7,408,699 B2 | 8/2008 | Wang et al. | |
| 7,411,719 B2 | 8/2008 | Paolini, Jr. et al. | |
| 7,453,445 B2 | 11/2008 | Amundson | |
| 7,492,339 B2 | 2/2009 | Amundson | |
| 7,492,505 B2 | 2/2009 | Liang et al. | |
| 7,528,822 B2 | 5/2009 | Amundson et al. | |
| 7,535,624 B2 | 5/2009 | Amundson et al. | |
| 7,583,251 B2 | 9/2009 | Arango et al. | |
| 7,602,374 B2 | 10/2009 | Zehner et al. | |
| 7,612,760 B2 | 11/2009 | Kawai | |
| 7,667,684 B2 | 2/2010 | Jacobson et al. | |
| 7,679,599 B2 | 3/2010 | Kawai | |
| 7,679,814 B2 | 3/2010 | Paolini, Jr. et al. | |
| 7,683,606 B2 | 3/2010 | Kang et al. | |
| 7,715,088 B2 | 5/2010 | Liang et al. | |
| 7,787,169 B2 | 8/2010 | Abramson et al. | |
| 7,788,628 B1 * | 8/2010 | Wei | G03F 7/705 716/51 |
| 7,800,813 B2 | 9/2010 | Wu et al. | |
| 7,839,564 B2 | 11/2010 | Whitesides et al. | |
| 7,859,742 B1 | 12/2010 | Chiu et al. | |
| 7,910,175 B2 | 3/2011 | Webber | |
| 7,952,557 B2 | 5/2011 | Amundson | |
| 7,952,790 B2 | 5/2011 | Honeyman et al. | |
| 7,982,479 B2 | 7/2011 | Wang et al. | |
| 7,982,941 B2 | 7/2011 | Lin et al. | |
| 7,999,787 B2 | 8/2011 | Amundson et al. | |
| 8,009,348 B2 | 8/2011 | Zehner et al. | |
| 8,040,594 B2 | 10/2011 | Paolini, Jr. et al. | |
| 8,054,526 B2 | 11/2011 | Bouchard | |
| 8,077,141 B2 | 12/2011 | Duthaler et al. | |
| 8,098,418 B2 | 1/2012 | Paolini, Jr. et al. | |
| 8,125,501 B2 | 2/2012 | Amundson et al. | |
| 8,139,050 B2 | 3/2012 | Jacobson et al. | |
| 8,159,636 B2 | 4/2012 | Sun et al. | |
| 8,174,490 B2 | 5/2012 | Whitesides et al. | |
| 8,243,013 B1 | 8/2012 | Sprague et al. | |
| 8,274,472 B1 | 9/2012 | Wang et al. | |
| 8,289,250 B2 | 10/2012 | Zehner et al. | |
| 8,300,006 B2 | 10/2012 | Zhou et al. | |
| 8,305,341 B2 | 11/2012 | Arango et al. | |
| 8,314,784 B2 | 11/2012 | Ohkami et al. | |
| 8,363,299 B2 | 1/2013 | Paolini, Jr. et al. | |
| 8,373,649 B2 | 2/2013 | Low et al. | |
| 8,384,658 B2 | 2/2013 | Albert et al. | |
| 8,422,116 B2 | 4/2013 | Sprague et al. | |
| 8,456,414 B2 | 6/2013 | Lin et al. | |
| 8,462,102 B2 | 6/2013 | Wong et al. | |
| 8,503,063 B2 | 8/2013 | Sprague | |
| 8,514,168 B2 | 8/2013 | Chung et al. | |
| 8,537,105 B2 | 9/2013 | Chiu et al. | |
| 8,558,783 B2 | 10/2013 | Wilcox et al. | |
| 8,558,786 B2 | 10/2013 | Lin | |
| 8,558,855 B2 | 10/2013 | Sprague et al. | |
| 8,576,164 B2 | 11/2013 | Sprague et al. | |
| 8,576,259 B2 | 11/2013 | Lin et al. | |
| 8,576,470 B2 | 11/2013 | Paolini, Jr. et al. | |
| 8,576,475 B2 | 11/2013 | Huang et al. | |
| 8,576,476 B2 | 11/2013 | Telfer et al. | |
| 8,605,032 B2 | 12/2013 | Liu et al. | |
| 8,605,354 B2 | 12/2013 | Zhang et al. | |
| 8,649,084 B2 | 2/2014 | Wang et al. | |
| 8,665,206 B2 | 3/2014 | Lin et al. | |
| 8,670,174 B2 | 3/2014 | Sprague et al. | |
| 8,681,191 B2 | 3/2014 | Yang et al. | |
| 8,704,756 B2 | 4/2014 | Lin | |
| 8,717,664 B2 | 5/2014 | Wang et al. | |
| 8,786,935 B2 | 7/2014 | Sprague | |
| 8,797,634 B2 | 8/2014 | Paolini, Jr. et al. | |
| 8,810,525 B2 | 8/2014 | Sprague | |
| 8,873,129 B2 | 10/2014 | Paolini, Jr. et al. | |
| 8,902,153 B2 | 12/2014 | Bouchard et al. | |
| 8,902,491 B2 | 12/2014 | Wang et al. | |
| 8,917,439 B2 | 12/2014 | Wang et al. | |
| 8,928,562 B2 | 1/2015 | Gates et al. | |
| 8,928,641 B2 | 1/2015 | Chiu et al. | |
| 8,964,282 B2 | 2/2015 | Wang et al. | |
| 8,976,444 B2 | 3/2015 | Zhang et al. | |
| 9,013,394 B2 | 4/2015 | Lin | |
| 9,013,783 B2 | 4/2015 | Sprague | |
| 9,019,197 B2 | 4/2015 | Lin | |
| 9,019,198 B2 | 4/2015 | Lin et al. | |

(56) References Cited

U.S. PATENT DOCUMENTS

| | | |
|---|---|---|
| 9,019,318 B2 | 4/2015 | Sprague et al. |
| 9,082,352 B2 | 7/2015 | Cheng et al. |
| 9,116,412 B2 | 8/2015 | Lin |
| 9,146,439 B2 | 9/2015 | Zhang |
| 9,170,468 B2 | 10/2015 | Lin et al. |
| 9,182,646 B2 | 11/2015 | Paolini, Jr. et al. |
| 9,195,111 B2 | 11/2015 | Anseth et al. |
| 9,199,441 B2 | 12/2015 | Danner |
| 9,218,773 B2 | 12/2015 | Sun et al. |
| 9,224,338 B2 | 12/2015 | Chan et al. |
| 9,224,342 B2 | 12/2015 | Lin et al. |
| 9,224,344 B2 | 12/2015 | Chung et al. |
| 9,230,492 B2 | 1/2016 | Harrington et al. |
| 9,251,736 B2 | 2/2016 | Lin et al. |
| 9,262,973 B2 | 2/2016 | Wu et al. |
| 9,279,906 B2 | 3/2016 | Kang |
| 9,285,649 B2 | 3/2016 | Du et al. |
| 9,299,294 B2 | 3/2016 | Lin et al. |
| 9,360,733 B2 | 6/2016 | Wang et al. |
| 9,361,836 B1 | 6/2016 | Telfer et al. |
| 9,383,623 B2 | 7/2016 | Lin et al. |
| 9,390,066 B2 | 7/2016 | Smith et al. |
| 9,390,661 B2 | 7/2016 | Chiu et al. |
| 9,423,666 B2 | 8/2016 | Wang et al. |
| 9,459,510 B2 | 10/2016 | Lin |
| 9,460,666 B2 | 10/2016 | Sprague et al. |
| 9,495,918 B2 | 11/2016 | Harrington et al. |
| 9,501,981 B2 | 11/2016 | Lin et al. |
| 9,513,527 B2 | 12/2016 | Chan et al. |
| 9,513,743 B2 | 12/2016 | Sjodin et al. |
| 9,514,667 B2 | 12/2016 | Lin |
| 9,541,813 B2 | 1/2017 | Sakamoto et al. |
| 9,541,814 B2 | 1/2017 | Lin et al. |
| 9,542,895 B2 | 1/2017 | Gates et al. |
| 9,612,502 B2 | 4/2017 | Danner et al. |
| 9,620,048 B2 | 4/2017 | Sim et al. |
| 9,640,119 B2 | 5/2017 | Lin et al. |
| 9,671,668 B2 | 6/2017 | Chan et al. |
| 9,672,766 B2 | 6/2017 | Sjodin |
| 9,691,333 B2 | 6/2017 | Cheng et al. |
| 9,697,778 B2 | 7/2017 | Telfer et al. |
| 9,721,495 B2 | 8/2017 | Harrington et al. |
| 9,752,034 B2 | 9/2017 | Wu et al. |
| 9,759,980 B2 | 9/2017 | Du et al. |
| 9,792,861 B2 | 10/2017 | Chang et al. |
| 9,792,862 B2 | 10/2017 | Hung et al. |
| 9,812,073 B2 | 11/2017 | Lin et al. |
| 9,921,451 B2 | 3/2018 | Telfer et al. |
| 10,162,242 B2 | 12/2018 | Wang et al. |
| 10,209,556 B2 | 2/2019 | Rosenfeld et al. |
| 10,229,641 B2 | 3/2019 | Yang et al. |
| 10,276,109 B2 | 4/2019 | Crounse et al. |
| 10,319,313 B2 | 6/2019 | Harris et al. |
| 10,339,876 B2 | 7/2019 | Lin et al. |
| 10,353,266 B2 | 7/2019 | Bouchard et al. |
| 10,444,553 B2 | 10/2019 | Laxton |
| 10,467,984 B2 | 11/2019 | Buckley et al. |
| 10,593,272 B2 | 3/2020 | Telfer et al. |
| 10,672,350 B2 | 6/2020 | Amundson et al. |
| 10,678,111 B2 | 6/2020 | Telfer et al. |
| 11,049,463 B2 | 6/2021 | Lin et al. |
| 11,084,935 B2 | 8/2021 | Wu et al. |
| 11,151,951 B2 | 10/2021 | Lin et al. |
| 11,169,080 B2 | 11/2021 | Kroner et al. |
| 11,500,261 B2 | 11/2022 | Wu et al. |
| 11,675,244 B2 | 6/2023 | Visani et al. |
| 2003/0102858 A1 | 6/2003 | Jacobson et al. |
| 2004/0246562 A1 | 12/2004 | Chung et al. |
| 2005/0253777 A1 | 11/2005 | Zehner et al. |
| 2007/0103427 A1 | 5/2007 | Zhou et al. |
| 2007/0176912 A1 | 8/2007 | Beames et al. |
| 2008/0024429 A1 | 1/2008 | Zehner |
| 2008/0024482 A1 | 1/2008 | Gates et al. |
| 2008/0043318 A1 | 2/2008 | Whitesides et al. |
| 2008/0136774 A1 | 6/2008 | Harris et al. |
| 2008/0303780 A1 | 12/2008 | Sprague et al. |
| 2009/0225398 A1 | 9/2009 | Duthaler et al. |
| 2010/0156780 A1 | 6/2010 | Jacobson et al. |
| 2010/0194733 A1 | 8/2010 | Lin et al. |
| 2010/0194789 A1 | 8/2010 | Lin et al. |
| 2010/0220121 A1 | 9/2010 | Zehner et al. |
| 2010/0265561 A1 | 10/2010 | Gates et al. |
| 2011/0043543 A1 | 2/2011 | Chen et al. |
| 2011/0063314 A1 | 3/2011 | Chiu et al. |
| 2011/0221740 A1 | 9/2011 | Yang et al. |
| 2012/0001957 A1 | 1/2012 | Liu et al. |
| 2012/0098740 A1 | 4/2012 | Chiu et al. |
| 2013/0063333 A1 | 3/2013 | Arango et al. |
| 2013/0249782 A1 | 9/2013 | Wu et al. |
| 2014/0055840 A1 | 2/2014 | Zang et al. |
| 2014/0078576 A1 | 3/2014 | Sprague |
| 2014/0204012 A1 | 7/2014 | Wu et al. |
| 2014/0240210 A1 | 8/2014 | Wu et al. |
| 2014/0253425 A1 | 9/2014 | Zalesky et al. |
| 2014/0293398 A1 | 10/2014 | Wang et al. |
| 2014/0362213 A1 | 12/2014 | Tseng |
| 2015/0005720 A1 | 1/2015 | Zang |
| 2015/0118390 A1 | 4/2015 | Rosenfeld et al. |
| 2015/0262255 A1 | 9/2015 | Khajehnouri et al. |
| 2015/0268531 A1 | 9/2015 | Wang et al. |
| 2015/0301246 A1 | 10/2015 | Zang et al. |
| 2016/0012710 A1 | 1/2016 | Lu et al. |
| 2016/0180777 A1 | 6/2016 | Lin et al. |
| 2018/0136533 A1* | 5/2018 | Telfer .................. C09B 67/0013 |
| 2020/0103335 A1* | 4/2020 | Kroner ................. G01N 17/008 |

OTHER PUBLICATIONS

Yamaguchi, Y. et al., "Toner display using insulative particles charged triboelectrically", Asia Display/IDW '01, pp. 1729-1730, Paper AMD4-4 (2001).

Hertel, Dirk, "Optical measurement standards for reflective e-paper to predict colors displayed in ambient illumination environments," Color Res Appl, 2018; 1-15.

Korean Intellectual Property Office, "International Search Report and Written Opinion", PCT/US2021/057534, Feb. 21, 2022.

He, Wenyao et al., "Driving Waveform Design of Electrophoretic Display Based on Optimized Particle Activation for a Rapid Response Speed", Micromachines, vol. 11, Book. 498, p. 1-15 (2020).

European Patent Office, "Extended European Search Report", EP Appl. No. 21887709.0, Jan. 25, 2024.

\* cited by examiner

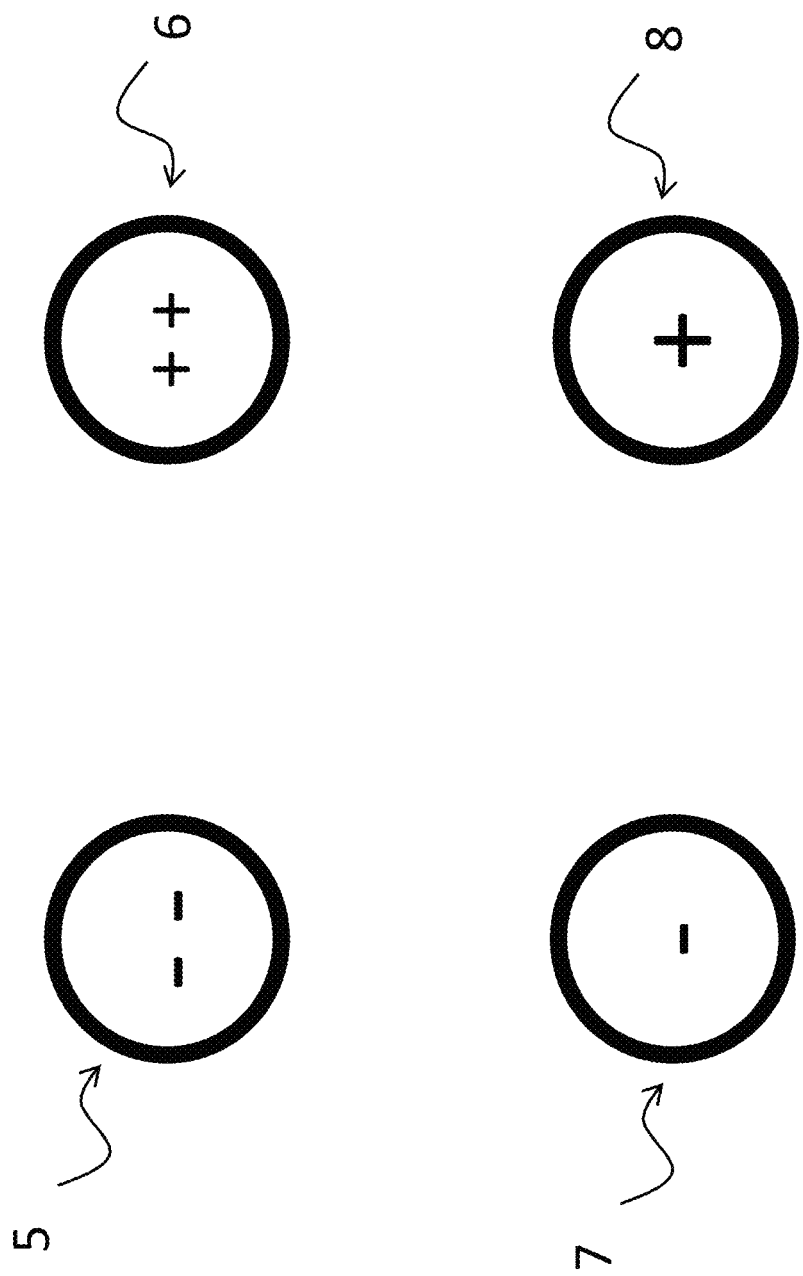

ENHANCED PUSH-PULL (EPP) WAVEFORMS FOR ACHIEVING PRIMARY COLOR SETS IN MULTI-COLOR ELECTROPHORETIC DISPLAYS

RELATED APPLICATIONS

This application is a continuation of U.S. patent application Ser. No. 18/369,991 filed on Sep. 19, 2023, which is a continuation of U.S. patent application Ser. No. 18/115,129 filed on Feb. 28, 2023 (issued as U.S. Pat. No. 11,798,506 on Oct. 24, 2023), which is a continuation of U.S. patent application Ser. No. 17/515,838 filed on Nov. 1, 2021 (issued as U.S. Pat. No. 11,620,959 on Apr. 4, 2023), which claims priority to U.S. Provisional Patent Application No. 63/108,521, filed Nov. 2, 2020, all of which applications are incorporated by reference in their entireties. All patents and publications disclosed herein are also incorporated by reference in their entireties.

BACKGROUND

An electrophoretic display (EPD) changes color by modifying the position of a charged colored particle with respect to a light-transmissive viewing surface. Such electrophoretic displays are typically referred to as "electronic paper" or "ePaper" because the resulting display has high contrast and is sunlight-readable, much like ink on paper. Electrophoretic displays have enjoyed widespread adoption in eReaders, such as the AMAZON KINDLE® because the electrophoretic displays provide a book-like reading experience, use little power, and allow a user to carry a library of hundreds of books in a lightweight handheld device.

For many years, electrophoretic displays included only two types of charged color particles, black and white. (To be sure, "color" as used herein includes black and white.) The white particles are often of the light scattering type, and comprise, e.g., titanium dioxide, while the black particle are absorptive across the visible spectrum, and may comprise carbon black, or an absorptive metal oxide, such as copper chromite. In the simplest sense, a black and white electrophoretic display only requires a light-transmissive electrode at the viewing surface, a back electrode, and an electrophoretic medium including oppositely charged white and black particles. When a voltage of one polarity is provided, the white particles move to the viewing surface, and when a voltage of the opposite polarity is provided the black particles move to the viewing surface. If the back electrode includes controllable regions (pixels)—either segmented electrodes or an active matrix of pixel electrodes controlled by transistors—a pattern can be made to appear electronically at the viewing surface. The pattern can be, for example, the text to a book.

More recently, a variety of color option have become commercially available for electrophoretic displays, including three-color displays (black, white, red; black white, yellow), and four color displays (black, white, red, yellow). Similar to the operation of black and white electrophoretic displays, electrophoretic displays with three or four reflective pigments operate similar to the simple black and white displays because the desired color particle is driven to the viewing surface. The driving schemes are far more complicated than only black and white, but in the end, the optical function of the particles is the same.

Advanced Color electronic Paper (ACeP™) also includes four particles, but the cyan, yellow, and magenta particles are subtractive rather than reflective, thereby allowing thousands of colors to be produced at each pixel. The color process is functionally equivalent to the printing methods that have long been used in offset printing and ink-jet printers. A given color is produced by using the correct ratio of cyan, yellow, and magenta on a bright white paper background. In the instance of ACeP, the relative positions of the cyan, yellow, magenta and white particles with respect to the viewing surface will determine the color at each pixel. While this type of electrophoretic display allows for thousands of colors at each pixel, it is critical to carefully control the position of each of the (50 to 500 nanometer-sized) pigments within a working space of about 10 to 20 micrometers in thickness. Obviously, variations in the position of the pigments will result in incorrect colors being displayed at a given pixel. Accordingly, exquisite voltage control is required for such a system. More details of this system are available in the following U.S. patents, all of which are incorporated by reference in their entireties: U.S. Pat. Nos. 9,361,836, 9,921,451, 10,276,109, 10,353,266, 10,467,984, and 10,593,272.

This invention relates to waveforms for driving color electrophoretic displays, especially, but not exclusively, electrophoretic displays capable of rendering more than two colors using a single layer of electrophoretic material comprising a plurality of colored particles, for example white, cyan, yellow, and magenta particles. In some instances two of the particles will be positively-charged, and two particles will be negatively-charged. In some instances, one positively-charged particle will have a thick polymer shell and one negatively-charged particle has a thick polymer shell.

The term gray state is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate gray state would actually be pale blue. Indeed, as already mentioned, the change in optical state may not be a color change at all. The terms black and white may be used hereinafter to refer to the two extreme optical states of a display, and should be understood as normally including extreme optical states which are not strictly black and white, for example the aforementioned white and dark blue states.

The terms bistable and bistability are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called multi-stable rather than bistable, although for convenience the term bistable may be used herein to cover both bistable and multi-stable displays.

The term impulse, when used to refer to driving an electrophoretic display, is used herein to refer to the integral of the applied voltage with respect to time during the period in which the display is driven. The term waveform, when used to refer to driving an electrophoretic display is used to describe a series or pattern of voltages provided to an electrophoretic medium over a given time period (seconds, frames, etc.) to produce a desired optical effect in the electrophoretic medium.

A particle that absorbs, scatters, or reflects light, either in a broad band or at selected wavelengths, is referred to herein as a colored or pigment particle. Various materials other than pigments (in the strict sense of that term as meaning insoluble colored materials) that absorb or reflect light, such as dyes or photonic crystals, etc., may also be used in the electrophoretic media and displays of the present invention.

Particle-based electrophoretic displays have been the subject of intense research and development for a number of years. In such displays, a plurality of charged particles (sometimes referred to as pigment particles) move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., Electrical toner movement for electronic paper-like display, IDW Japan, 2001, Paper HCS1-1, and Yamaguchi, Y., et al., Toner display using insulative particles charged triboelectrically, IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Microcell structures, wall materials, and methods of forming microcells; see for example U.S. Pat. Nos. 7,072,095 and 9,279,906;

(d) Methods for filling and sealing microcells; see for example U.S. Pat. Nos. 7,144,942 and 7,715,088;

(e) Films and sub-assemblies containing electro-optic materials; see for example U.S. Pat. Nos. 6,982,178 and 7,839,564;

(f) Backplanes, adhesive layers and other auxiliary layers and methods used in displays; see for example U.S. Pat. Nos. 7,116,318 and 7,535,624;

(g) Color formation color adjustment; see for example U.S. Pat. Nos. 6,017,584; 6,545,797; 6,664,944; 6,788,452; 6,864,875; 6,914,714; 6,972,893; 7,038,656; 7,038,670; 7,046,228; 7,052,571; 7,075,502; 7,167,155; 7,385,751; 7,492,505; 7,667,684; 7,684,108; 7,791,789; 7,800,813; 7,821,702; 7,839,564; 7,910,175; 7,952,790; 7,956,841; 7,982,941; 8,040,594; 8,054,526; 8,098,418; 8,159,636; 8,213,076; 8,363,299; 8,422,116; 8,441,714; 8,441,716; 8,466,852; 8,503,063; 8,576,470; 8,576,475; 8,593,721; 8,605,354; 8,649,084; 8,670,174; 8,704,756; 8,717,664; 8,786,935; 8,797,634; 8,810,899; 8,830,559; 8,873,129; 8,902,153; 8,902,491; 8,917,439; 8,964,282; 9,013,783; 9,116,412; 9,146,439; 9,164,207; 9,170,467; 9,170,468; 9,182,646; 9,195,111; 9,199,441; 9,268,191; 9,285,649; 9,293,511; 9,341,916; 9,360,733; 9,361,836; 9,383,623; and 9,423,666; and U.S. Patent Applications Publication Nos. 2008/0043318; 2008/0048970; 2009/0225398; 2010/0156780; 2011/0043543; 2012/0326957; 2013/0242378; 2013/0278995; 2014/0055840; 2014/0078576; 2014/0340430; 2014/0340736; 2014/0362213; 2015/0103394; 2015/0118390; 2015/0124345; 2015/0198858; 2015/0234250; 2015/0268531; 2015/0301246; 2016/0011484; 2016/0026062; 2016/0048054; 2016/0116816; 2016/0116818; and 2016/0140909;

(h) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/

0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2015/0262551; 2016/0071465; 2016/0078820; 2016/0093253; 2016/0140910; and 2016/0180777 (these patents and applications may hereinafter be referred to as the MEDEOD (MEthods for Driving Electro-optic Displays) applications);

(i) Applications of displays; see for example U.S. Pat. Nos. 7,312,784 and 8,009,348; and (j) Non-electrophoretic displays, as described in U.S. Pat. No. 6,241,921; and U.S. Patent Applications Publication No. 2015/0277160; and U.S. Patent Application Publications No. 2015/0005720 and 2016/0012710.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, U.S. Pat. No. 6,866,760. Accordingly, for purposes of the present application, such polymer-dispersed electrophoretic media are regarded as sub-species of encapsulated electrophoretic media.

A related type of electrophoretic display is a so-called microcell electrophoretic display. In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449.

Although electrophoretic media are often opaque (since, for example, in many electrophoretic media, the particles substantially block transmission of visible light through the display) and operate in a reflective mode, many electrophoretic displays can be made to operate in a so-called shutter mode in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode can be used in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word printing is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

As indicated above most simple prior art electrophoretic media essentially display only two colors. Such electrophoretic media either use a single type of electrophoretic particle having a first color in a colored fluid having a second, different color (in which case, the first color is displayed when the particles lie adjacent the viewing surface of the display and the second color is displayed when the particles are spaced from the viewing surface), or first and second types of electrophoretic particles having differing first and second colors in an uncolored fluid (in which case, the first color is displayed when the first type of particles lie adjacent the viewing surface of the display and the second color is displayed when the second type of particles lie adjacent the viewing surface). Typically the two colors are black and white. If a full color display is desired, a color filter array may be deposited over the viewing surface of the monochrome (black and white) display. Displays with color filter arrays rely on area sharing and color blending to create color stimuli. The available display area is shared between three or four primary colors such as red/green/blue (RGB) or red/green/blue/white (RGBW), and the filters can be arranged in one-dimensional (stripe) or two-dimensional (2×2) repeat patterns. Other choices of primary colors or more than three primaries are also known in the art. The three (in the case of RGB displays) or four (in the case of RGBW displays) sub-pixels are chosen small enough so that at the intended viewing distance they visually blend together to a single pixel with a uniform color stimulus ('color blending'). The inherent disadvantage of area sharing is that the colorants are always present, and colors can only be modulated by switching the corresponding pixels of the underlying monochrome display to white or black (switching the corresponding primary colors on or off). For example, in an ideal RGBW display, each of the red, green, blue and white primaries occupy one fourth of the display area (one sub-pixel out of four), with the white sub-pixel being as bright as the underlying monochrome display white, and each of the colored sub-pixels being no lighter than one third of the monochrome display white. The brightness of the white color shown by the display as a whole cannot be more than one half of the brightness of the white sub-pixel (white areas of the display are produced by displaying the one white sub-pixel out of each four, plus each colored sub-pixel in its colored form being equivalent to one third of a white sub-pixel, so the three colored sub-pixels combined contribute no more than the one white sub-pixel). The brightness and saturation of colors is lowered by area-sharing with color pixels switched to black. Area sharing is especially problematic when mixing yellow because it is lighter than any other color of equal brightness, and saturated yellow is almost as bright as white. Switching the blue pixels (one fourth of the display area) to black makes the yellow too dark.

U.S. Pat. Nos. 8,576,476 and 8,797,634 describe multi-color electrophoretic displays having a single back plane comprising independently addressable pixel electrodes and a common, light-transmissive front electrode. Between the back plane and the front electrode is disposed a plurality of electrophoretic layers. Displays described in these applications are capable of rendering any of the primary colors (red, green, blue, cyan, magenta, yellow, white and black) at any pixel location. However, there are disadvantages to the use of multiple electrophoretic layers located between a single set of addressing electrodes. The electric field experienced by the particles in a particular layer is lower than would be the case for a single electrophoretic layer addressed with the same voltage. In addition, optical losses in an electrophoretic layer closest to the viewing surface (for example, caused by light scattering or unwanted absorption) may affect the appearance of images formed in underlying electrophoretic layers.

Attempts have been made to provide full-color electrophoretic displays using a single electrophoretic layer. For example, U.S. Pat. No. 8,917,439 describes a color display comprising an electrophoretic fluid that comprises one or two types of pigment particles dispersed in a clear and colorless or colored solvent, the electrophoretic fluid being disposed between a common electrode and a plurality of pixel or driving electrodes. The driving electrodes are arranged to expose a background layer. U.S. Pat. No. 9,116,412 describes a method for driving a display cell filled with an electrophoretic fluid comprising two types of charged particles carrying opposite charge polarities and of two contrast colors. The two types of pigment particles are dispersed in a colored solvent or in a solvent with non-charged or slightly charged colored particles dispersed therein. The method comprises driving the display cell to display the color of the solvent or the color of the non-charged or slightly charged colored particles by applying a driving voltage that is about 1 to about 20% of the full driving voltage. U.S. Pat. Nos. 8,717,664 and 8,964,282 describe an electrophoretic fluid, and a method for driving an electrophoretic display. The fluid comprises first, second and third type of pigment particles, all of which are dispersed in a solvent or solvent mixture. The first and second types of pigment particles carry opposite charge polarities, and the third type of pigment particles has a charge level being less than about 50% of the charge level of the first or second type. The three types of pigment particles have different levels of threshold voltage, or different levels of mobility, or both. None of these patent applications disclose full color display in the sense in which that term is used below.

SUMMARY

Disclosed herein are improved methods of driving full color electrophoretic displays and method for identifying waveforms for full color electrophoretic displays using these drive methods. In one aspect, a method of driving an electrophoretic display is disclosed. The driving method includes providing an electrophoretic medium comprising four sets of particles, wherein each particle set has a different optical characteristic and a different charge characteristic, disposing the electrophoretic medium between a first light transmitting electrode and a second electrode, providing a voltage driver configured to provide at least five voltage levels, a high negative voltage, a medium negative voltage, a zero voltage, a medium positive voltage, and a high positive voltage, and driving the electrophoretic medium to a desired optical state by providing a push-pull waveform. Such a push-pull waveform includes a first positive portion composed of a first pulse and a second pulse, the first pulse having a first positive magnitude and a first time width and the second pulse having a second positive magnitude and a second time width. The push-pull waveform additionally includes a second negative portion composed of a third pulse and a fourth pulse, the third pulse having a first negative magnitude and a third time width and the fourth pulse having a second negative magnitude and a fourth time width. The first positive magnitude, the second positive magnitude, the first negative magnitude, and the second negative magnitude are all non-zero, and at least three of the first, second, third, and fourth time widths are non-zero. In an embodiment, the first set of particles is reflective and second, third, and fourth sets of particles are subtractive. In an embodiment, two of the sets of particles are positively charged and two of the sets of particles are negatively charged. In an embodiment, one of the sets of particles are positively charged and three of the sets of particles are negatively charged. In an embodiment, three of the sets of particles are positively charged and one of the sets of particles are negatively charged. In an embodiment, the second electrode comprises a plurality of pixel electrodes arranged in an array. In an embodiment, the second electrode is light transmitting. In an embodiment, the high negative voltage is between −30V and −20V, the medium negative voltage is between −20V and −2V, the medium positive voltage is between 2V and 20V, and the high positive voltage is between 20V and 30V.

In another aspect, a method of identifying an enhanced push-pull waveform. The method of identifying an enhanced push-pull waveform includes selecting a finite set of voltages for driving an electrophoretic display, wherein the set includes at least five different voltage levels, selecting a finite time width of time for candidate waveforms, calculating all waveforms having a first positive portion composed of a first pulse and a second pulse, wherein the first pulse has a first positive magnitude and a first time width and the second pulse has a second positive magnitude and a second time width, and also having a second negative portion composed of a third pulse and a fourth pulse, the third pulse having a first negative magnitude and a third time width and the fourth pulse having a second negative magnitude and a fourth time width. The first positive magnitude, the second positive magnitude, the first negative magnitude, and the second negative magnitude each have a value from the finite set of voltages, and the sum of the first pulse width, the second pulse width, the third pulse width, and the fourth pulse width equals the finite time width. The final step is calculating an optical state produced by each of the candidate waveforms using a model of an electrophoretic display having an electrophoretic medium comprising four sets of particles, wherein each particle set has a different optical characteristic and a different charge characteristic, and the electrophoretic medium is disposed between a first light transmitting electrode and a second electrode, and selecting a waveform to produce a targeted optical state. In an embodiment, selecting comprises comparing a target color to a predicted output color. In an embodiment, the selected waveforms are input into a physical electrophoretic display including an electrophoretic medium comprising four sets of particles, wherein each particle set has a different optical characteristic and a different charge characteristic, and the electrophoretic medium is disposed between a first light transmitting electrode and a second electrode. In an embodiment, the color output of the physical electrophoretic display is evaluated and compared to the target color. In an embodiment, the finite set of voltages includes a high negative voltage between −30V and −20V, a medium negative voltage between −20V and −2V, a medium positive voltage between 2V and 20V, and a high positive voltage between 20V and 30V. In an embodiment, the finite set of voltages includes −27V, 0V, and +27V. In an embodiment, the first set of particles is reflective and second, third, and fourth sets of particles are subtractive. In an embodiment, two of the sets of particles are positively charged and two of the sets of particles are negatively charged. In an embodiment, one of the sets of particles are positively charged and three of the sets of particles are negatively charged. In an embodiment, three of the sets of particles are positively charged and one of the sets of particles are negatively charged.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 2B shows in schematic form four types of different pigment particles used in a multi-particle electrophoretic medium.

DETAILED DESCRIPTION

The invention details methods for identifying enhanced push pull waveforms for driving a multi-particle color electrophoretic medium, for example, wherein at least two of the particles are colored and subtractive and at least one of the particles is scattering. Typically, such a system includes a white particle and cyan, yellow, and magenta subtractive primary colored particles. Such a system is shown schematically in FIG. 1, and it can provide white, yellow, red, magenta, blue, cyan, green, and black at every pixel.

In the instance of ACeP, each of the eight principal colors (red, green, blue, cyan magenta, yellow, black and white) corresponds to a different arrangement of the four pigments, such that the viewer only sees those colored pigments that are on the viewing side of the white pigment (i.e., the only pigment that scatters light). It has been found that waveforms to sort the four pigments into appropriate configurations to make these colors need at least five voltage levels (high positive, low positive, zero, low negative, high negative). See FIG. 1. To achieve the wider range of colors, additional voltage levels must be used for finer control of the pigments, e.g., seven voltage levels, e.g., nine voltage levels. The invention provides methods for identifying enhanced push pull waveforms to drive such an electrophoretic medium so that they refreshes of pixel colors are faster, less flashy, and result in a color spectrum that is more pleasing to the viewer.

The three particles providing the three subtractive primary colors, e.g., for an ACeP system, may be substantially non-light-scattering ("SNLS"). The use of SNLS particles allows mixing of colors and provides for more color outcomes than can be achieved with the same number of scattering particles. These thresholds must be sufficiently separated relative to the voltage driving levels for avoidance of cross-talk between particles, and this separation necessitates the use of high addressing voltages for some colors. In addition, addressing the colored particle with the highest threshold also moves all the other colored particles, and these other particles must subsequently be switched to their desired positions at lower voltages. Such a step-wise color-addressing scheme produces flashing of unwanted colors and a long transition time.

Figure 1:
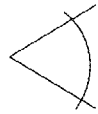
FIG. 1 is a schematic cross-section showing the positions of the various colored particles in an electrophoretic medium of the present invention when displaying black, white, the three subtractive primary and the three additive primary colors.

As already mentioned, FIG. 1 of the accompanying drawings is a schematic cross-section showing the positions of the various particles in an ACeP-type electrophoretic medium when displaying black, white, the three subtractive primary colors and the three additive primary colors. In FIG. 1, it is assumed that the viewing surface of the display is at the top (as illustrated), i.e., a user views the display from this direction, and light is incident from this direction. As already noted, in preferred embodiments only one of the four particles used in the electrophoretic medium of the present invention substantially scatters light, and in FIG. 1 this particle is assumed to be the white pigment. This light-scattering white particle forms a white reflector against which any particles above the white particles (as illustrated in FIG. 1) are viewed. Light entering the viewing surface of the display passes through these particles, is reflected from the white particles, passes back through these particles and emerges from the display. Thus, the particles above the white particles may absorb various colors and the color appearing to the user is that resulting from the combination of particles above the white particles. Any particles disposed below (behind from the user's point of view) the white particles are masked by the white particles and do not affect the color displayed. Because the second, third and fourth particles are substantially non-light-scattering, their order or arrangement relative to each other is unimportant, but for reasons already stated, their order or arrangement with respect to the white (light-scattering) particles is critical.

More specifically, when the cyan, magenta and yellow particles lie below the white particles (Situation [A] in FIG. 1), there are no particles above the white particles and the pixel simply displays a white color. When a single particle is above the white particles, the color of that single particle is displayed, yellow, magenta and cyan in Situations [B], [D] and [F] respectively in FIG. 1. When two particles lie above the white particles, the color displayed is a combination of those of these two particles; in FIG. 1, in Situation [C], magenta and yellow particles display a red color, in Situation [E], cyan and magenta particles display a blue color, and in Situation [G], yellow and cyan particles display a green color. Finally, when all three colored particles lie above the white particles (Situation [H] in FIG. 1), all the incoming light is absorbed by the three subtractive primary colored particles and the pixel displays a black color.

It is possible that one subtractive primary color could be rendered by a particle that scatters light, so that the display would comprise two types of light-scattering particle, one of which would be white and another colored. In this case, however, the position of the light-scattering colored particle with respect to the other colored particles overlying the white particle would be important. For example, in rendering the color black (when all three colored particles lie over the white particles) the scattering colored particle cannot lie over the non-scattering colored particles (otherwise they will be partially or completely hidden behind the scattering particle and the color rendered will be that of the scattering colored particle, not black).

It would not be easy to render the color black if more than one type of colored particle scattered light.

FIG. 1 shows an idealized situation in which the colors are uncontaminated (i.e., the light-scattering white particles completely mask any particles lying behind the white particles). In practice, the masking by the white particles may be imperfect so that there may be some small absorption of light by a particle that ideally would be completely masked. Such contamination typically reduces both the lightness and the chroma of the color being rendered. In the electrophoretic medium of the present invention, such color contamination should be minimized to the point that the colors formed are commensurate with an industry standard for color rendition. A particularly favored standard is SNAP (the standard for newspaper advertising production), which specifies L*, a* and b* values for each of the eight primary colors referred to above. (Hereinafter, "primary colors" will be used to refer to the eight colors, black, white, the three subtractive primaries and the three additive primaries as shown in FIG. 1.)

Figure 2A:
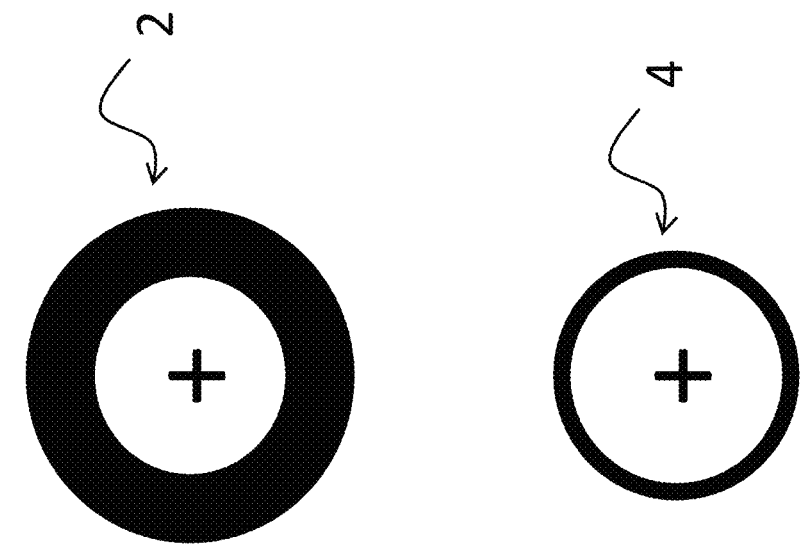
FIG. 2A shows in schematic form four types of different pigment particles used in a multi-particle electrophoretic medium.
Figure 2A:
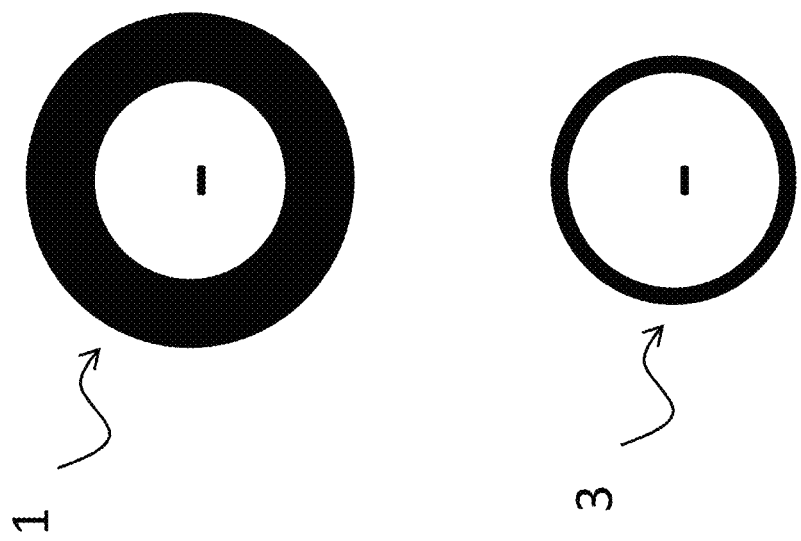

FIGS. 2A and 2B show schematic cross-sectional representations of the four pigment types (1-4; 5-8) used in an ACeP-type electrophoretic display. In FIG. 2A, the polymer shell adsorbed to the core pigment is indicated by the dark shading, while the core pigment itself is shown as unshaded. A wide variety of forms may be used for the core pigment: spherical, acicular or otherwise anisometric, aggregates of smaller particles (i.e., "grape clusters"), composite particles comprising small pigment particles or dyes dispersed in a binder, and so on as is well known in the art. The polymer shell may be a covalently-bonded polymer made by grafting processes or chemisorption as is well known in the art, or may be physisorbed onto the particle surface. For example, the polymer may be a block copolymer comprising insoluble and soluble segments.

In the embodiment of FIG. 2A, first and second particle types preferably have a more substantial polymer shell than third and fourth particle types. The light-scattering white particle is of the first or second type (either negatively or positively charged). In the discussion that follows it is assumed that the white particle bears a negative charge (i.e., is of Type 1), but it will be clear to those skilled in the art that the general principles described will apply to a set of particles in which the white particles are positively charged.

Additionally, as depicted in FIG. 2B, it is not required that the first and second particle types have differential polymer shells as compared to the third and fourth particle types. As shown in FIG. 2B, sufficient differential charge on the four particles will allow for electrophoretic control of the particles and creation of the desired color at the viewing surface. For example, particle 5 may have a negative charge of greater magnitude than particle 7, while particle 6 has a greater magnitude positive charge as compared to particle 8. It is also possible that other combinations of polymer functionality and charge (or particle size) can be used; however, it must be the case that all four particles can be separated from each other in the presence of suitable electric fields, e.g., lower voltage electric fields that can be produced with commercial digital electronics.

In a system of FIG. 2A, the present invention the electric field required to separate an aggregate formed from mixtures of particles of types 3 and 4 in the suspending solvent containing a charge control agent is greater than that required to separate aggregates formed from any other combination of two types of particle. The electric field required to separate aggregates formed between the first and second types of particle is, on the other hand, less than that required to separate aggregates formed between the first and fourth particles or the second and third particles (and of course less than that required to separate the third and fourth particles).

In FIG. 2A the core pigments comprising the particles are shown as having approximately the same size, and the zeta potential of each particle, although not shown, is assumed to be approximately the same. What varies is the thickness of the polymer shell surrounding each core pigment. As shown in FIG. 2A, this polymer shell is thicker for particles of types 1 and 2 than for particles of types 3 and 4.

Figure 2C:
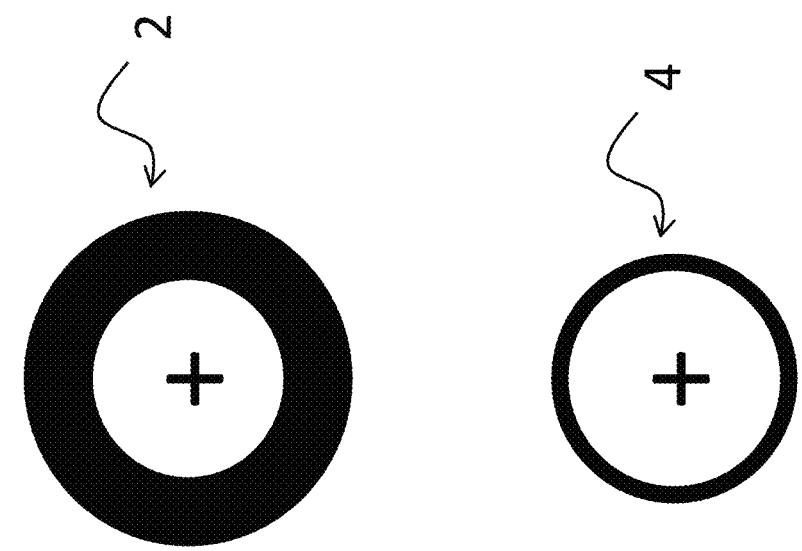
FIG. 2C shows in schematic form four types of different pigment particles used in a multi-particle electrophoretic medium.
Figure 2C:
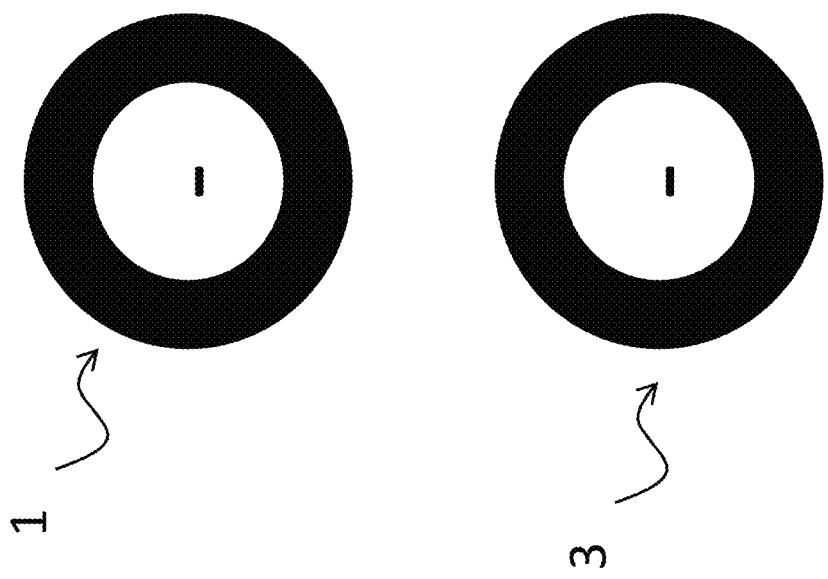

It is not necessary in the present invention that all the colored pigments behave as described above with reference to FIGS. 2A and 2B. As shown in FIG. 2C, the third particle may have a substantial polymer shell and may have a wide range of charge, including weakly positive. In this case the surface chemistry of the third particle must be different from that of the first particle. For example, the first particle my bear a covalently-attached silane shell to which is grafted a polymer that may be comprised of acrylic or styrenic monomers that are preferably hydrophobic. The third particle may comprise a polymer shell that is not covalently attached, but is deposited onto the surface of the core particle by dispersion polymerization. In such cases the invention is not limited to the mechanism described above with reference to FIGS. 2A and 2B.

To obtain a high-resolution display, individual pixels of a display must be addressable without interference from adjacent pixels. One way to achieve this objective is to provide an array of non-linear elements, such as transistors or diodes, with at least one non-linear element associated with each pixel, to produce an "active matrix" display. An addressing or pixel electrode, which addresses one pixel, is connected to an appropriate voltage source through the associated non-linear element. Typically, when the non-linear element is a transistor, the pixel electrode is connected to the drain of the transistor, and this arrangement will be assumed in the following description, although it is essentially arbitrary and the pixel electrode could be connected to the source of the transistor. Conventionally, in high resolution arrays, the pixels are arranged in a two-dimensional array of rows and columns, such that any specific pixel is uniquely defined by the intersection of one specified row and one specified column. The sources of all the transistors in each column are connected to a single column electrode, while the gates of all the transistors in each row are connected to a single row electrode; again the assignment of sources to rows and gates to columns is conventional but essentially arbitrary, and could be reversed if desired. The row electrodes are connected to a row driver, which essentially ensures that at any given moment only one row is selected, i.e., that there is applied to the selected row electrode a select voltage such as to ensure that all the transistors in the selected row are conductive, while there is applied to all other rows a non-select voltage such as to ensure that all the transistors in these non-selected rows remain non-conductive. The column electrodes are connected to column drivers, which place upon the various column electrodes voltages selected to drive the pixels in the selected row to their desired optical states. (The aforementioned voltages are relative to a common front electrode which is conventionally provided on the opposed side of the electro-optic medium from the non-linear array and extends across the whole display.) After a pre-selected interval known as the "line address time" the selected row is deselected, the next row is selected, and the voltages on the column drivers are changed so that the next line of the display is written. This process is repeated so that the entire display is written in a row-by-row manner. The time between addressing in the display is known as a "frame." Thus, a display that is updated at 60 Hz has frames that are 16 msec.

Conventionally, each pixel electrode has associated therewith a capacitor electrode such that the pixel electrode and the capacitor electrode form a capacitor; see, for example, International Patent Application WO 01/07961. In some embodiments, N-type semiconductor (e.g., amorphous silicon) may be used to from the transistors and the "select" and "non-select" voltages applied to the gate electrodes can be positive and negative, respectively.

Figure 3:
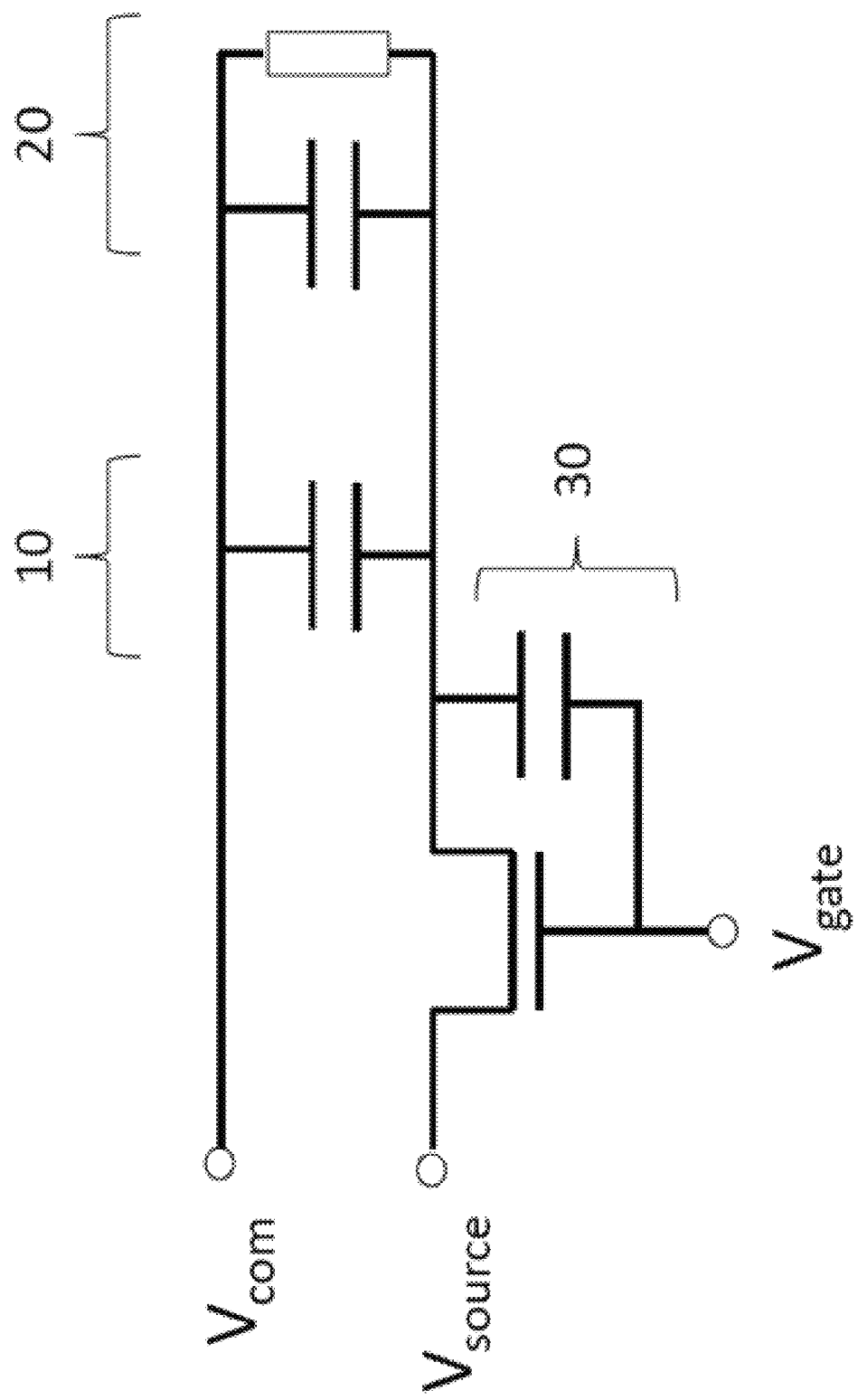
FIG. 3 illustrates an exemplary equivalent circuit of a single pixel of an electrophoretic display.

FIG. 3 of the accompanying drawings depicts an exemplary equivalent circuit of a single pixel of an electrophoretic display. As illustrated, the circuit includes a capacitor 10 formed between a pixel electrode and a capacitor electrode. The electrophoretic medium 20 is represented as a capacitor and a resistor in parallel. In some instances, direct or indirect coupling capacitance 30 between the gate electrode of the transistor associated with the pixel and the pixel electrode (usually referred to a as a "parasitic capacitance") may create unwanted noise to the display. Usually, the parasitic capacitance 30 is much smaller than that of the storage capacitor 10, and when the pixel rows of a display is being selected or deselected, the parasitic capacitance 30 may result in a small negative offset voltage to the pixel electrode, also known as a "kickback voltage", which is usually less than 2 volts. In some embodiments, to compensate for the unwanted "kickback voltage", a common potential $V_{com}$, may be supplied to the top plane electrode and the capacitor electrode associated with each pixel, such that, when $V_{com}$ is set to a value equal to the kickback voltage ($V_{KB}$), every voltage supplied to the display may be offset by the same amount, and no net DC-imbalance experienced.

A set of waveforms for driving a color electrophoretic display having four particles is described in U.S. Pat. No. 9,921,451, incorporated by reference herein. In U.S. Pat. No. 9,921,451, seven different voltages are applied to the pixel electrodes: three positive, three negative, and zero. However, in some embodiments, the maximum voltages used in these waveforms are higher than that can be handled by amorphous silicon thin-film transistors. In such instances, suitable high voltages can be obtained by the use of top plane switching. It is costly and inconvenient, however, to use as many separate power supplies as there are $V_{com}$ settings when top plane switching is used. Furthermore, top plane switching is known to increase kickback, thereby degrading the stability of the color states.

Methods for fabricating an ACeP-type electrophoretic display have been discussed in the prior art. The electrophoretic fluid may be encapsulated in microcapsules or incorporated into microcell structures that are thereafter sealed with a polymeric layer. The microcapsule or microcell layers may be coated or embossed onto a plastic substrate or film bearing a transparent coating of an electrically conductive material. This assembly may be laminated to a backplane bearing pixel electrodes using an electrically conductive adhesive. Alternatively, the electrophoretic fluid may be dispensed directly on a thin open-cell grid that has been arranged on a backplane including an active matrix of pixel electrodes. The filled grid can then be top-sealed with an integrated protective sheet/light-transmissive electrode.

Figure 4:
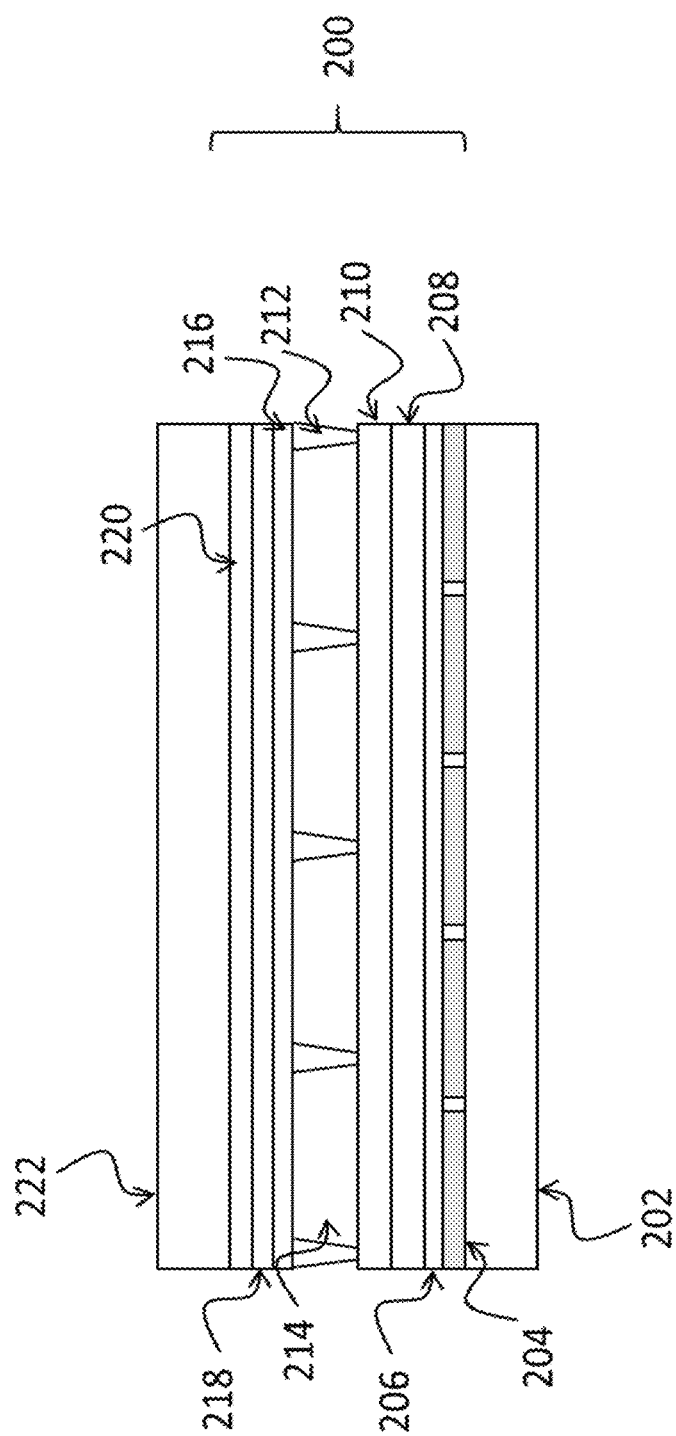
FIG. 4 shows the layers of an exemplary electrophoretic color display.

FIG. 4 shows a schematic, cross-sectional drawing (not to scale) of a display structure 200 of an ACeP-type electrophoretic display. In display 200 the electrophoretic fluid is illustrated as being confined to microcups, although equivalent structures incorporating microcapsules may also be used. Substrate 202, which may be glass or plastic, bears pixel electrodes 204 that are either individually addressed segments or associated with thin film transistors in an active matrix arrangement. (The combination of substrate 202 and electrodes 204 is conventionally referred to as the back plane of the display.) Layer 206 is an optional dielectric layer according to the invention applied to the backplane. (Methods for depositing a suitable dielectric layer are described in U.S. patent application Ser. No. 16/862,750, incorporated by reference.) The front plane of the display comprises transparent substrate 222 that bears a transparent, electrically conductive coating 220. Overlying electrode layer 220 is an optional dielectric layer 218. Layer (or layers) 216 are polymeric layer(s) that may comprise a primer layer for adhesion of microcups to transparent electrode layer 220 and some residual polymer comprising the bottom of the microcups. The walls of the microcups 212 are used to contain the electrophoretic fluid 214. The microcups are sealed with layer 210 and the whole front plane structure is adhered to the backplane using electrically-conductive adhesive layer 208. Processes for forming the microcups are described in the prior art, e.g., in U.S. Pat. No. 6,930,818. In some instance, the microcups are less than 20 µm in depth, e.g., less than 15 µm in depth, e.g., less than 12 µm in depth, e.g., about 10 µm in depth, e.g., about 8 µm in depth.

Most commercial electrophoretic displays use amorphous silicon based thin-film transistors (TFTs) in the construction of active matrix backplanes (202/024) because of the wider availability of fabrication facilities and the costs of the various starting materials. Unfortunately, amorphous silicon thin-film transistors become unstable when supplied gate voltages that would allow switching of voltages higher than about +/−15V. Nonetheless, as described below, the performance of ACeP is improved when the magnitudes of the high positive and negative voltages are allowed to exceed +/−15V. Accordingly, as described in previous disclosures, improved performance is achieved by additionally changing the bias of the top light-transmissive electrode with respect to the bias on the backplane pixel electrodes, also known as top-plane switching. Thus, if a voltage of +30V (relative to the backplane) is needed, the top plane may be switched to −15V while the appropriate backplane pixel is switched to +15V. Methods for driving a four-particle electrophoretic system with top-plane switching are described in greater detail in, for example, U.S. Pat. No. 9,921,451.

There are several disadvantages to the top-plane switching approach. Firstly, when (as is typical) the top plane is not pixelated, but is a single electrode extending over the whole surface of the display, its electrical potential affects every pixel in the display. If it is set to match one of the voltages of the largest magnitude available from the backplane (for example, the largest positive voltage) when this voltage is asserted on the backplane there will be no net voltage across the ink. When any other available voltage is supplied to a backplane, there will always be a voltage of negative polarity supplied to any pixel in the display. Thus, if a waveform requires a positive voltage this cannot be supplied to any pixel until the top plane voltage is changed. A typical waveform for use in a multicolor display of the third embodiment uses multiple pulses of both positive and negative polarity, and the lengths of these pulses are not of the same length in waveforms used for making different colors. In addition, the phase of the waveform may be different for different colors: in other words, a positive pulse may precede a negative pulse for some colors, whereas a negative pulse may precede a positive pulse for others. To accommodate such cases, "rests" (i.e., pauses) must be built into the waveforms. In practice, this results in waveforms being much longer (by as much as a factor of two) than they ideally need to be.

Secondly, in top plane switching there are limits to the voltage levels that may be chosen. If the voltages applied to the top plane are denoted $V_{t+}$ and $V_{t-}$, respectively, and those applied to the back plane $V_{b+}$ and $V_{b-}$, respectively, in order to achieve a zero volt condition across the electrophoretic fluid it must be true that $|V_{t+}|=|V_{b+}|$ and $|V_{t-}|=|V_{b-}|$. However, it is not necessary for the magnitudes of the positive and negative voltages to be the same.

In prior embodiments of the Advanced Color electronic Paper (ACeP), the waveform (voltage against time curve) applied to the pixel electrode of the backplane of a display of the invention is described and plotted, while the front electrode is assumed to be grounded (i.e., at zero potential). The electric field experienced by the electrophoretic medium is of course determined by the difference in potential between the backplane and the front electrode and the distance separating them. The display is typically viewed through its front electrode, so that it is the particles adjacent the front electrode which control the color displayed by the pixel, and if it is sometimes easier to understand the optical transitions involved if the potential of the front electrode relative to the backplane is considered; this can be done simply by inverting the waveforms discussed below.

Figure 5:
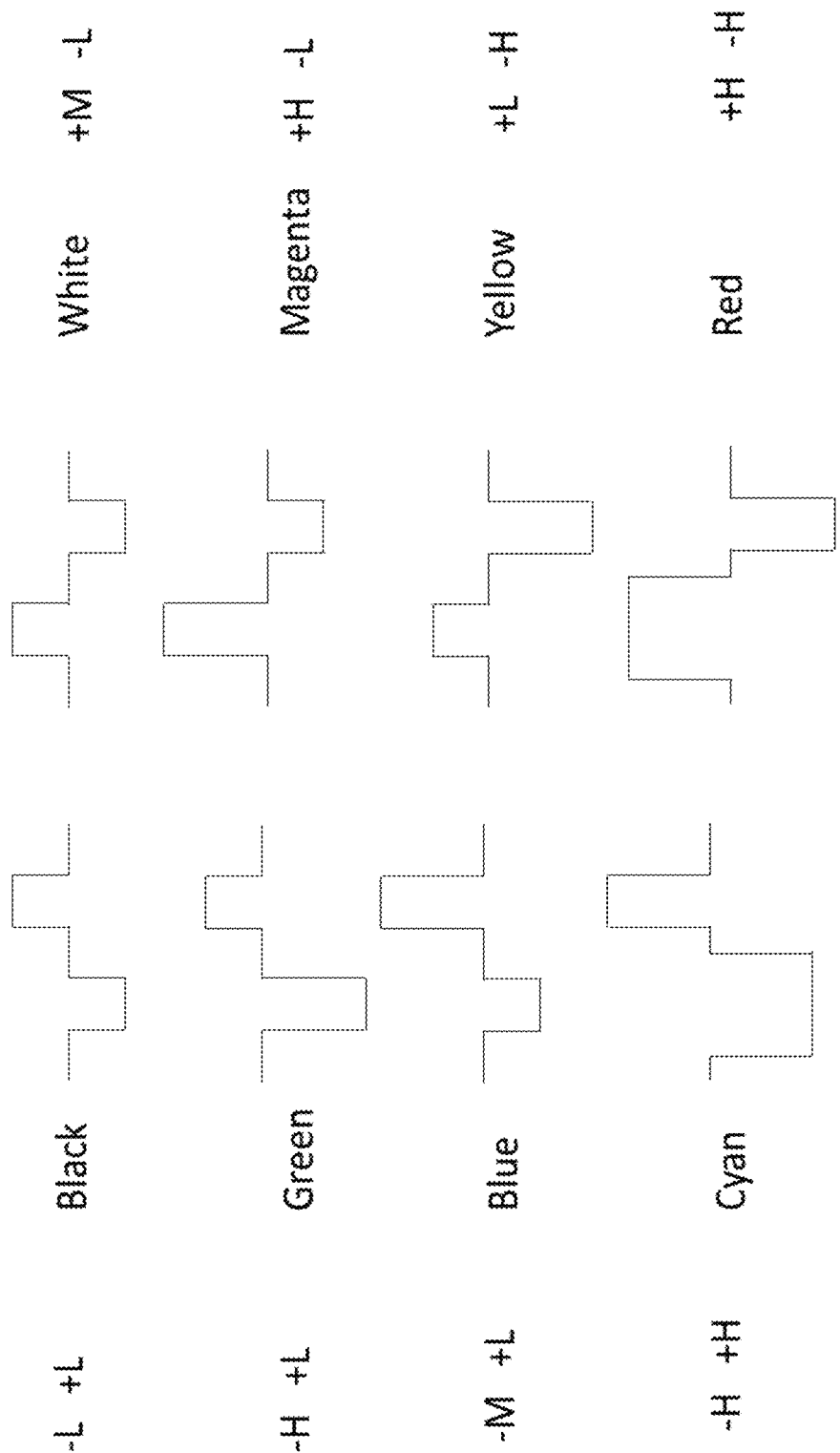
FIG. 5 shows the simple push pull waveforms that can be used to achieve a set of primary colors in an optimized system including one reflective (white) particle, and three subtractive (cyan, yellow, magenta) particles.

FIG. 5 shows typical waveforms (in simplified form) used to drive a four-particle color electrophoretic display system described above. Such waveforms have a simple "push-pull" structure: i.e., they consist of a dipole comprising two pulses of opposite polarity. The magnitudes and lengths of these pulses determine the color obtained. At a minimum, there should be five such voltage levels. FIG. 5 shows high and low positive and negative voltages, as well as zero volts. Typically, "low" (L) refers to a range of about five-15V, while "high" (H) refers to a range of about 15-30V. In general, the higher the magnitude of the "high" voltages, the better the color gamut achieved by the display. The "medium" (M) level is typically around 15V; however, the value for M will depend somewhat on the composition of the particles, as well as the environment of the electrophoretic medium. In some embodiments, the high negative voltage is between −30V and −20V, the medium negative voltage is between −20V and −2V, the medium positive voltage is between 2V and 20V, and the high positive voltage is between 20V and 30V. For example, the high negative voltage is-27V, the medium negative voltage is-15V, the medium positive voltage is 15V, and the high positive voltage is 27V. If only three voltages are available (i.e., $+V_{high}$, 0, and $-V_{high}$) it may be possible to achieve the same result as addressing at a lower voltage (say, $V_{high}/n$ where n is a positive integer >1) by addressing with pulses of voltage $V_{high}$ but with a duty cycle of 1/n.

Figure 6:
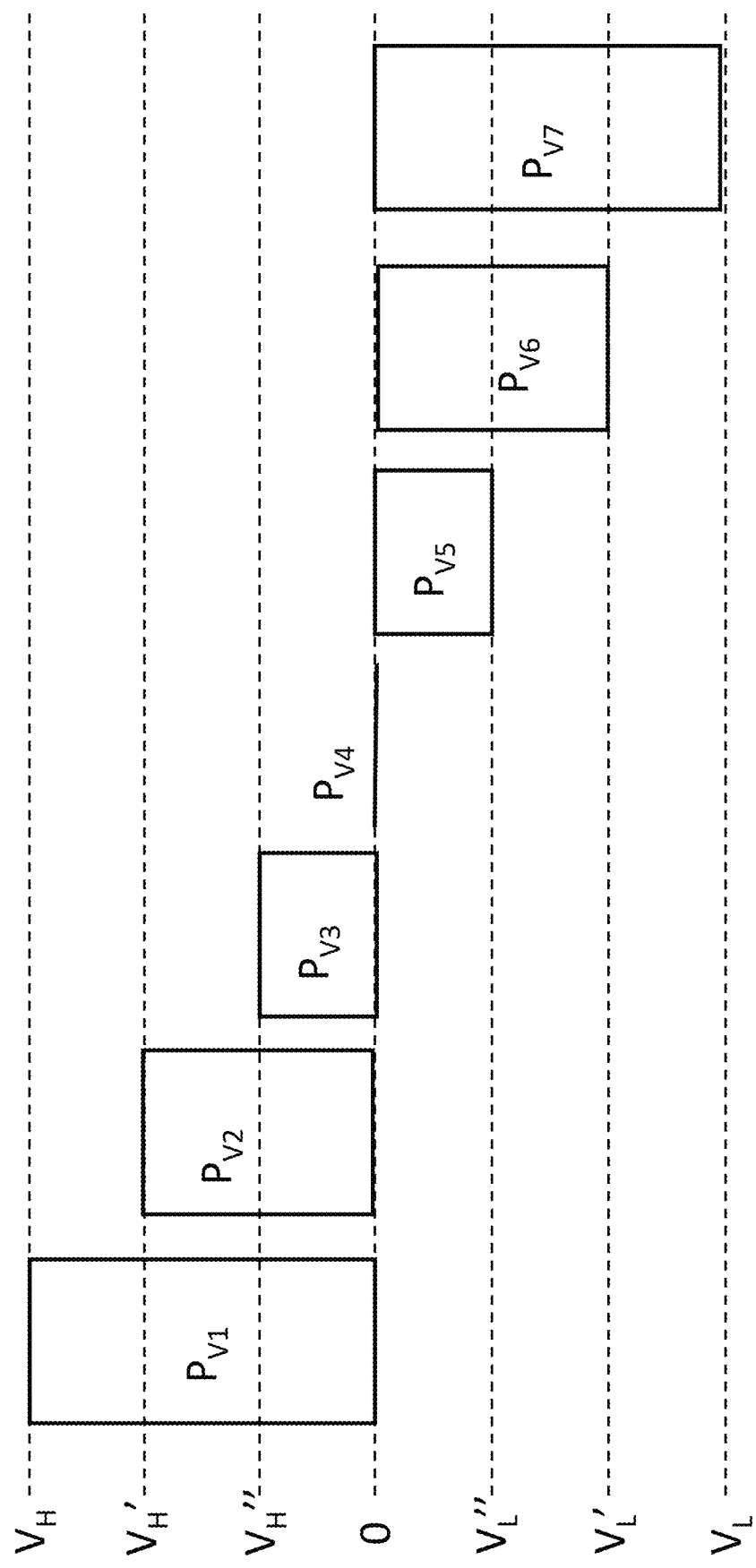
FIG. 6 illustrates the set of voltage pulses available to be used with a seven level driver of an electrophoretic display. Every waveform that is available to drive an electrophoretic medium is some combination of these voltage pulses.

Enhanced push-pull (EPP) waveforms can be achieved with more driving levels. For example, a seven-level driver might provide seven different voltages to the data lines during the update of a selected pixel of the display (e.g., $V_H$, $V_H'$, $V_H''$, 0, $V_L''$, $V_L'$, $V_L$; e.g., $+V_H$, $+V_M$, $+V_L$, 0, $-V_L$, $-V_M$, $-V_H$). The spacing between drive levels can be the same, or different, depending upon the formulation of the electrophoretic medium. For example, $+V_H=27V$, $+V_M=15V$, $+V_L=5V$, 0, $-V_L=-5V$, $-V_M=-15V$, $-V_H=-27V$. For example, $+V_H=30V$, $+V_M=20V$, $+V_L=10V$, 0, $-V_L=-10V$, $-V_M=-20V$, $-V_H=-30V$. Regardless, when using a seven-level driver to drive an active matrix backplane having a single controller, the controller can only update a given pixel one frame at a time. Accordingly, any enhanced push pull waveform is composed of some combination of pulses, each lasting a frame period, i.e., as shown in FIG. 6. The resulting waveform, used to achieve a desired optical state in the medium, is constructed from some combination of the pulses of FIG. 6, assuming that such a waveform may have no, or some number, n, of each of the pulses of FIG. 6.

Implementing seven-level drivers with sufficient voltage amplitude is difficult with standard amorphous silicon backplanes. It has been found that using control transistors from less-common materials, which have a higher electron mobility, allow the transistors to switch larger control voltages, for example +/−30V, as needed to implement seven-level driving. Newly-developed active matrix backplanes may include thin film transistors incorporating metal oxide materials, such as tungsten oxide, tin oxide, indium oxide, and zinc oxide. In these applications, a channel formation region is formed for each transistor using such metal oxide materials, allowing faster switching of higher voltages, e.g., within the range of about −27V to +27V. Such transistors typically include a gate electrode, a gate-insulating film (typically $SiO_2$), a metal source electrode, a metal drain electrode, and a metal oxide semiconductor film over the gate-insulating film, at least partially overlapping the gate electrode, source electrode, and drain electrode. Such backplanes are available from manufacturers such as Sharp/Foxconn, LG, and BOE. One preferred metal oxide material for such applications is indium gallium zinc oxide (IGZO). IGZO-TFT has 20-50 times the electron mobility of amorphous silicon. By using IGZO TFTs in an active matrix backplane, it is possible to provide voltages of greater than 30V via a suitable display driver.

Using, e.g., a seven-level driver, enhanced push pull (EPP) waveforms may use a much larger space of waveform shapes and durations to achieve the desired optical performance. EPP waveforms are restricted to be composed of a finite number of pulses, either positive or negative, where $N^P$ is a tractable number, where N is the number of possible voltage levels and P is the number of pulses. See, FIG. 6. For example, if N=7, P<5. For a set of voltage level choices, fixed waveform length, and number of pulses, all possible waveforms can be enumerated. For each pulse, we can have each of the N voltage levels, leading to $N^P$ unique voltage permutations (with replacement), where P is the number of pulses. For the pulse lengths, we can choose these subject to the constraint that the total length of the waveform, M, is fixed. If we consider the scenario with P pulses, there are $N*(N-1)^P$ unique voltage level choices for the P pulses, given that adjacent pulses cannot be of the same length (this would be P−1 pulses). We can then calculate the number of pulse lengths with as $$\binom{M-1}{P-1},$$

where this is read as M−1 choose P−1 (the binomial coefficient). In summation:

$$\# \text{ of waveforms} = N(N-1)^{P-1}\binom{M-1}{P-1}$$

The formulation describes the number of waveforms given the multi-pulse structure. This also consists of testing every one frame change in pulse lengths. In general, the number of waveforms could be reduced significantly by testing every D frames, which requires substitution in the equations above:

$$M' = \frac{M}{D}.$$

To calculate all possible unique pulse-based structures where P≤num pulses, we formulate, $$\# \text{ of waveforms} = \sum_{p=1}^{P} N(N-1)^{p-1}\binom{M-1}{p-1},$$

which yields after simplification, # of waveforms =

$$N^M - N(N-1)^P\binom{M-1}{P}{}_2F_1(1, -M+P+1; P+1; 1-N),$$

where $_2F_1$ is the hypergeometric function.

Of course, identifying the "best" waveform is not a simple task. Given N=7, P=3, M=42, the total number of unique waveforms is 206,640. Each of these 206,640 waveforms would need to be tested for a given set of environmental conditions (e.g., light source and temperature), and augmented with a prefix waveform to provide appropriate clearing (e.g., a shaking pulse) such that the initial state of the medium matched the expected start state for the waveform.

A more efficient way to identify preferred EPP waveforms is to virtually execute each proposed EPP waveform in a surrogate model representing the final display construction. A specific electrophoretic display construction can be represented by a transfer function. In its simplest form:

$$O(t) = f(V(t), x(0))$$

Where O(t) is the optical state as a function of time and $f$ is a function of the voltage applied to the display as a function of time, given some initial state of the system at t=0 (x(0)). Additional inputs can be specified here, including but not limited to temperature, relative humidity, and incident light spectrum. The function $f$ can be estimated using a variety of means, for example an ab initio model built from component measurements, however the preferred embodiment, described here, is one in which $f$ is represented by a differentiable deep learning network based upon a recurrent neural network architecture, described henceforth as $\tilde{f}$, as the true $f$ is being approximated by the deep learning-based modeling.

Figure 7:
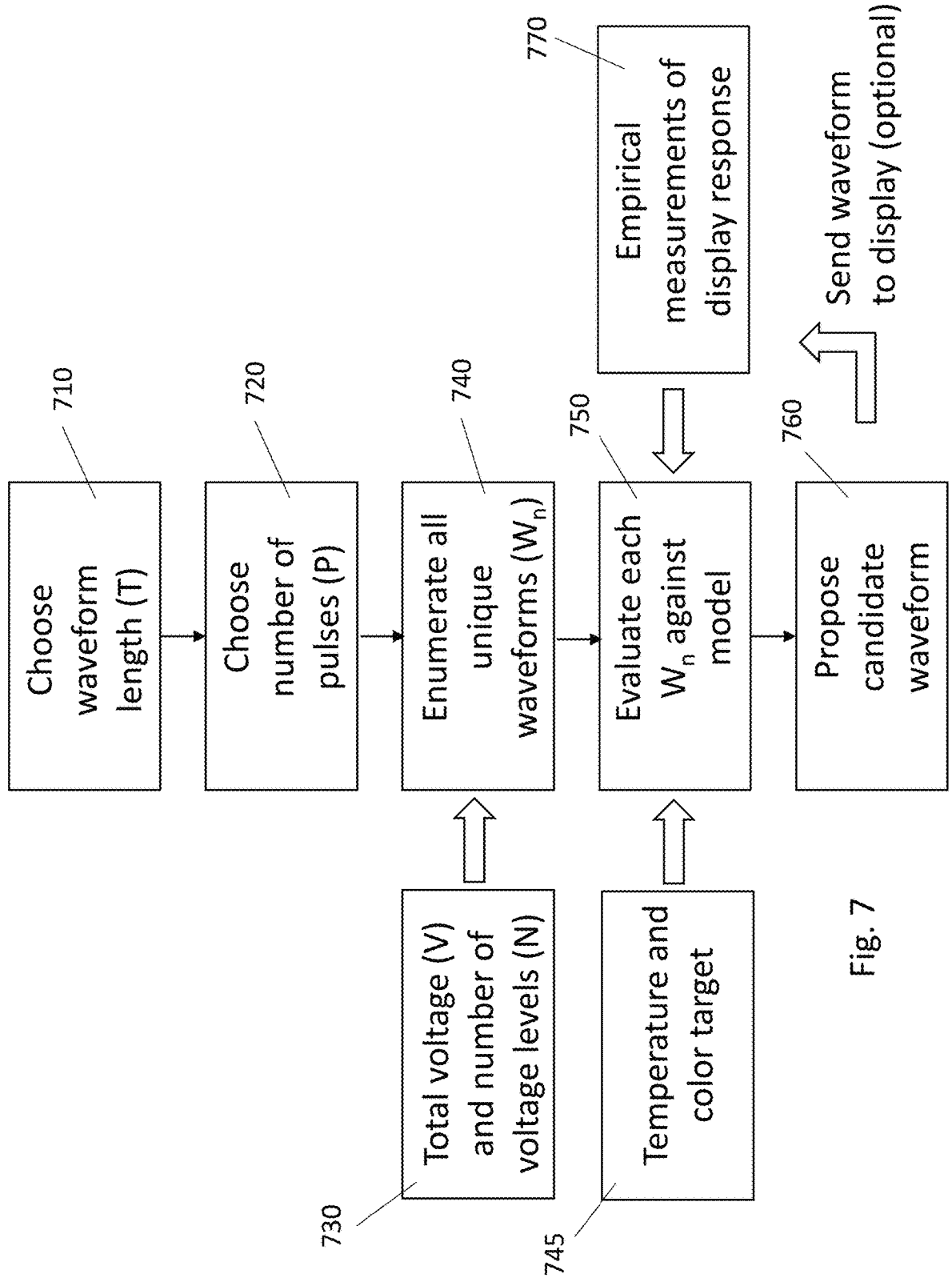
FIG. 7 illustrates an algorithm for identifying enhanced push pull waveforms.

Once $\tilde{f}$ is established, each enhanced push-pull (EPP) waveform can be evaluated on the surrogate model for the final optical state color value achieved, as well as intermediate states (optical trace info), and subsequently calculable quantities such as ghosting performance, voltage sensitivity, transition appearance (e.g., "flashiness") and temperature sensitivity. Any or all of these metrics can be combined into a total cost function that identifies preferred EPP waveforms, which are subsequently verified on the actual electrophoretic display under test. These subsequent measurements on the actual electrophoretic display can be fed back into the deep learning model to provide further refinements of $\tilde{f}$. This complete process is described in block format in FIG. 7. It should be recognized that the method described in FIG. 7 is exhaustive within its parameterization, i.e., all possible permutations are searched. Thus, the method naturally overcomes a common challenge of a parameterization, i.e., how to assure that the optimization algorithm sufficiently samples parameter space. The combination of active matrix driving with a set clock cycle and a driver with finite voltage levels greatly reduces the parameter space, yet the output waveforms are meaningful and immediately applicable in the physical display. Thus, the EPP tuning method can be mathematically exhaustive, requiring no additional optimization when tuning the final waveform for a production display.

As shown in FIG. 7, the process begins with selecting the waveform length (710). As discussed above, limitations such as frame width, customer applications, and power consumption may constrain this calculation. Nonetheless, the method can be used for a variety of waveform lengths from 10s of milliseconds to many seconds. In steps (720) and (730) the number of pulses is selected and the total voltage and number of voltage levels are selected, respectively, which again may be limited by the cost and availability of storage media for the waveforms and commercial production limitations such as the cost of multiple power supplies versus the extra expense of a variable power supply. Once all of these factors are accumulated, a base set of unique waveforms is generated in step (740), whereupon each of the waveforms is evaluated against a color target in step (750). The color target may be, for example, an RGB color code or hex code for a digital image. Alternatively, the color target may be a Pantone color or CMYK print standard. The waveform that achieves the closest outcome to the color target is output as the candidate waveform in step (760). This waveform may be actually fed to a real four particle electrophoretic display corresponding to the modeled display, whereby the outcome is measured with a calibrated optical bench and compared to the target. In some embodiments, these measurements are fed back into the model via step (770). More details of a suitable calibrated optical bench for evaluating the output of a four particle electrophoretic display can be found at "Optical measurement standards for reflective e-paper to predict colors displayed in ambient illumination environments," *Color Research and Application*, vol. 43, issue 6, pages 907-921 (2018), which is incorporated by reference in its entirety.

Figure 8:
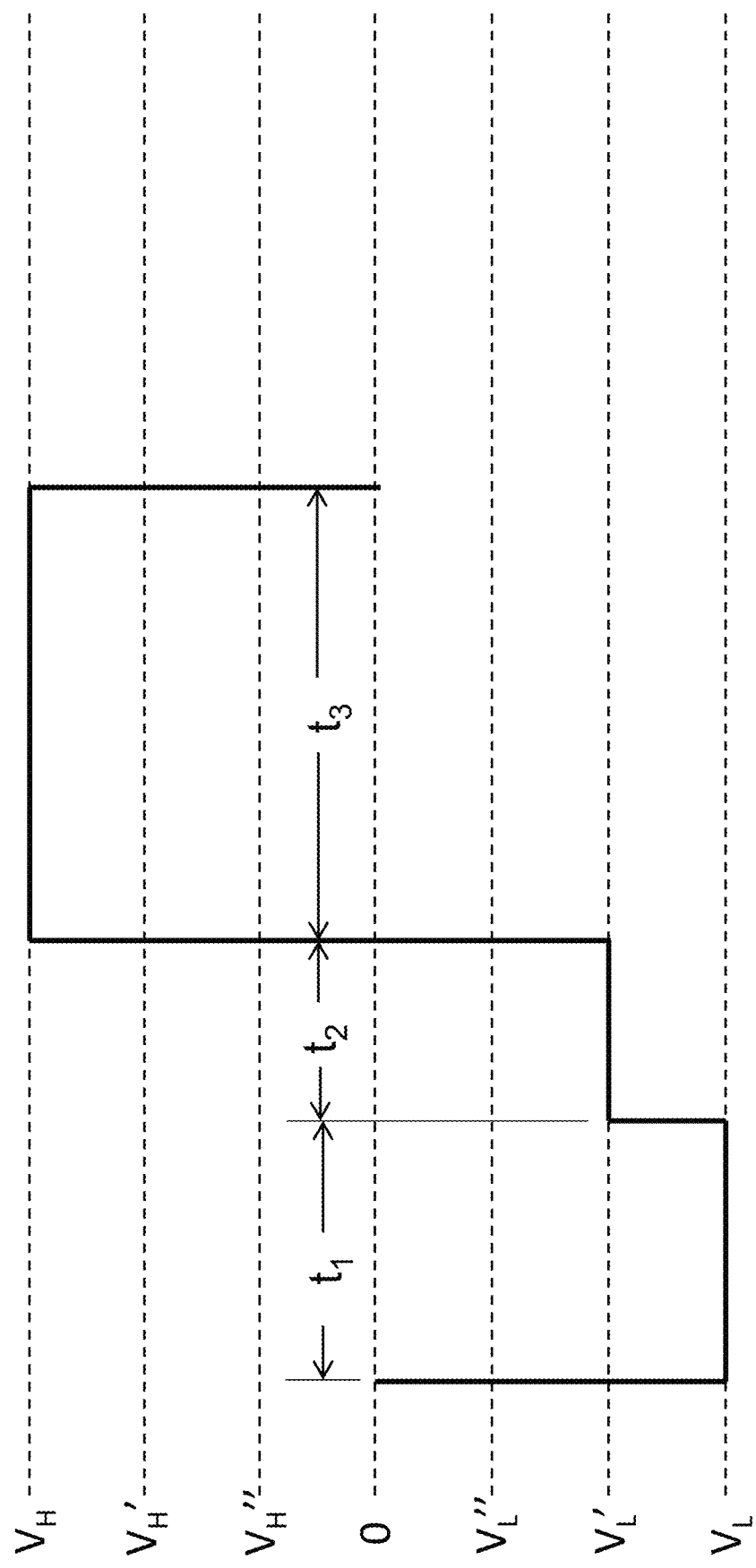
FIG. 8 shows an exemplary enhanced push pull waveform.
Figure 9:
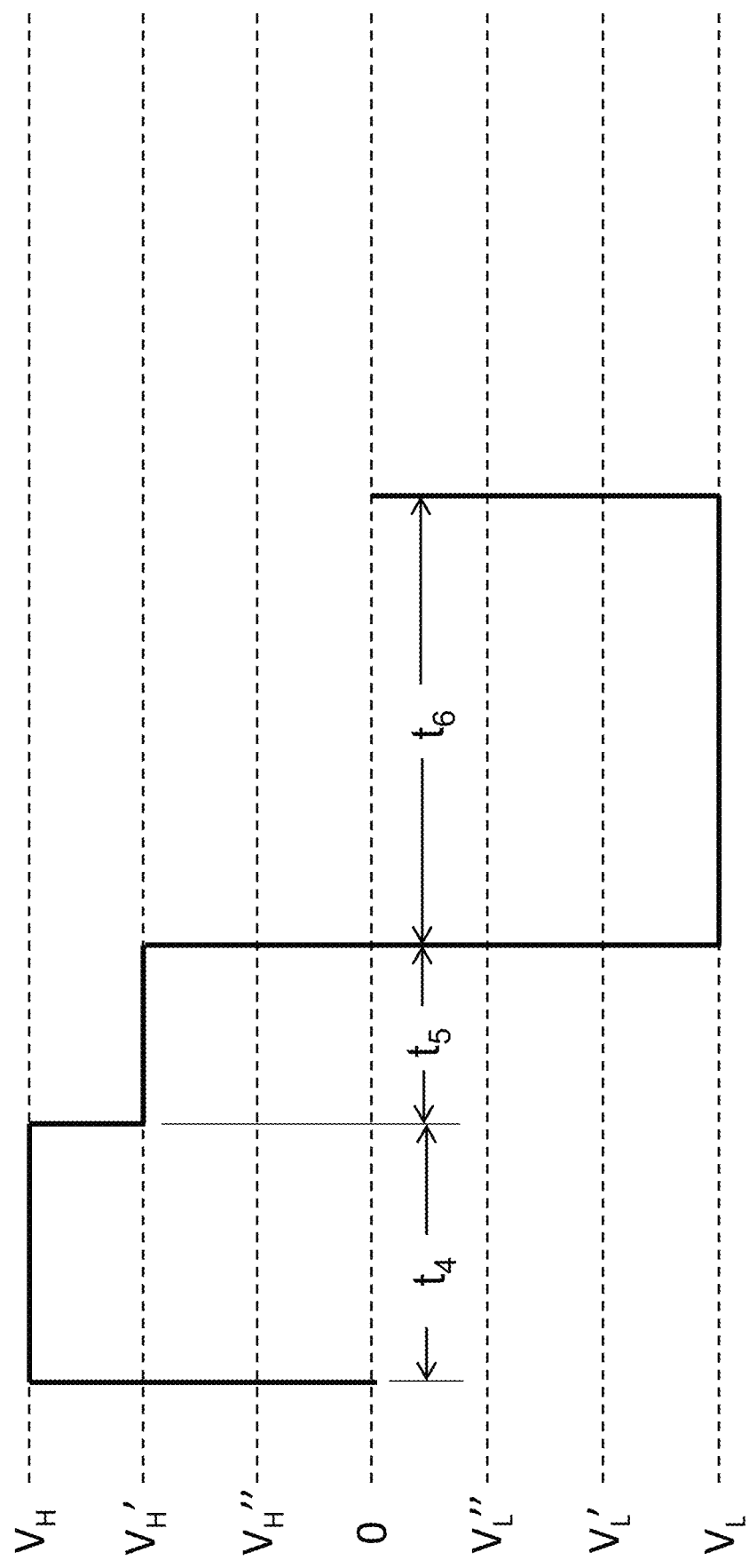
FIG. 9 shows an exemplary enhanced push pull waveform.

Using the methods described above, subsets of color waveforms for an ACeP-type system that are faster and less flashy are quickly isolated for further testing. Such push-pull waveforms may include dipoles that are actually bifurcated (or trifurcated) into some combination of pulse height and width of the relative polarity. For example, as shown in FIG. 8 and FIG. 9, an enhanced push pull waveform may include a first portion of the negative dipole having a magnitude of $V_L$ and a first width $t_1$, as well as a second portion of the negative dipole having a magnitude of $V_L'$ and a second width $t_2$. The positive portion of the dipole can be a single pulse, e.g., of magnitude $V_H$ and third width $t_3$, or the positive portion of the dipole can be bi- or tri-furcated as dictated by the model $\tilde{f}$ and the user needs for the update (e.g., speed, energy consumption, color specificity). Of course, the mirror enhanced push pull function, as illustrated in FIG. 9, may be a better waveform for the needs of the user.

Of course, achieving the desired color with push pull driving pulses is contingent on the particles starting the process from a known state, which is unlikely to be the last color displayed on the pixel. Accordingly, a series of reset pulses precede the driving pulses, which increases the amount of time required to update a pixel from a first color to a second color. The reset pulses are described in greater detail in U.S. Pat. No. 10,593,272, incorporated by reference. The lengths of these pulses (refresh and address) and of any rests (i.e., periods of zero voltage between them may be chosen so that the entire waveform (i.e., the integral of voltage with respect to time over the whole waveform) is DC balanced (i.e., the integral of voltage over time is substantially zero). DC balance can be achieved by adjusting the lengths of the pulses and rests in the reset phase so that the net impulse supplied in the reset phase is equal in magnitude and opposite in sign to the net impulse supplied in the address phase, during which phase the display is switched to a particular desired color.

The use of the EPP waveform is superior to completely unconstrained waveforms in that the transition appearance is bounded to be a set of a maximum of P abrupt color changes. While unconstrained waveforms could be designed to reduce the number of color changes, or to have pleasing transition appearance, it is a technically difficult problem requiring greater parsing of training data and more computing power. This is much easier with EPP waveforms selected as described herein. Moreover, this EPP tuning method allows for exhaustive enumeration of the square-pulse based waveforms that have historically provided a good trade-off between a simple waveform structure with managed transition appearance and complexity of optimization. It is also likely that preventing single frame drives and the number of large transients makes the resulting EPP waveforms more robust in other ways (temperature sensitivity, voltage sensitivity, robustness across manufacturing variability).

EXAMPLE

Figure 11:
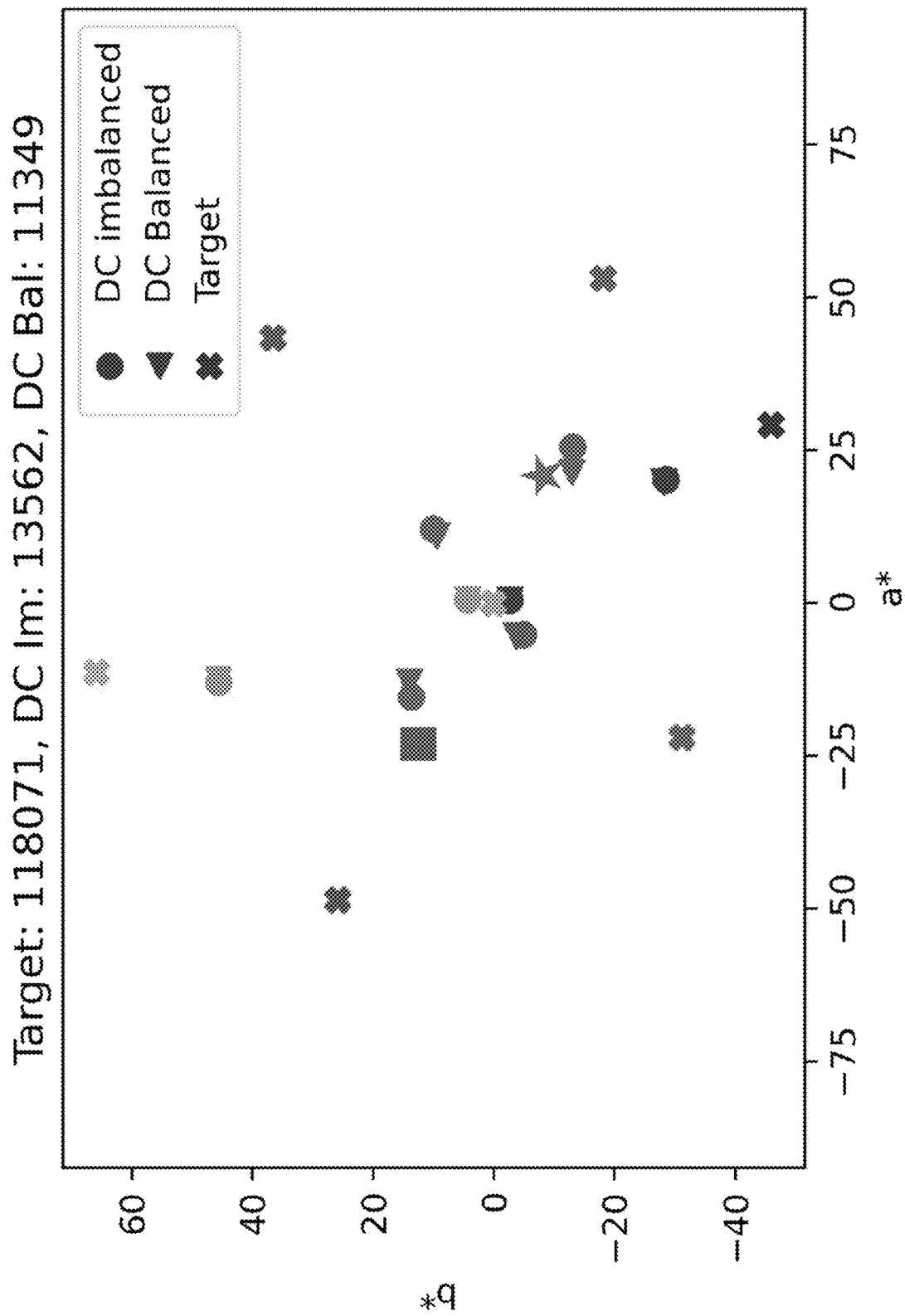
FIG. 11 shows a subset of DC-balanced EPP waveforms using a model of a metal oxide TFT backplane and a four particle ACeP-type electrophoretic medium.
Figure 12A:
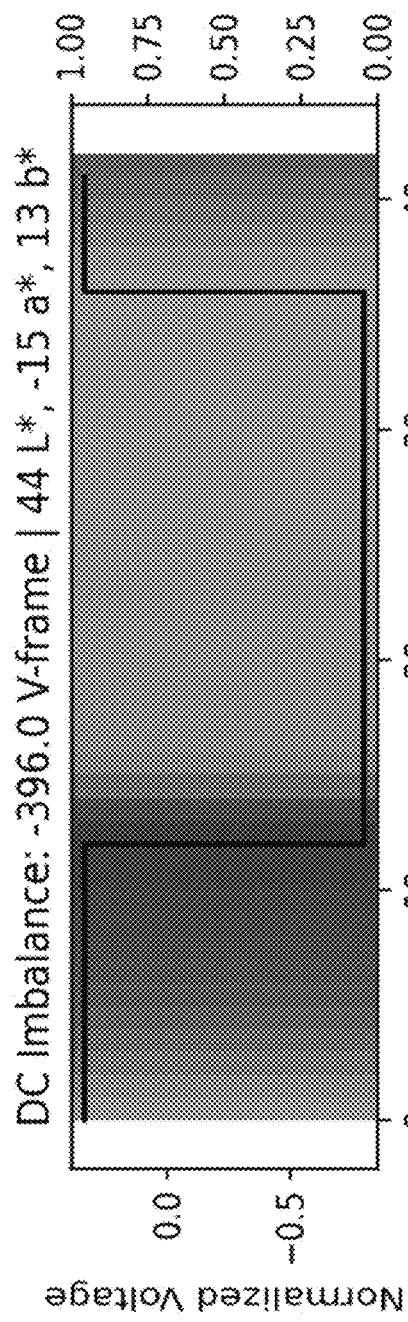
FIG. 12A and FIG. 12B compare calculated DC-imbalanced (FIG. 12A) and DC-balanced (FIG. 12B) waveforms to achieve a specific green color.
Figure 12B:
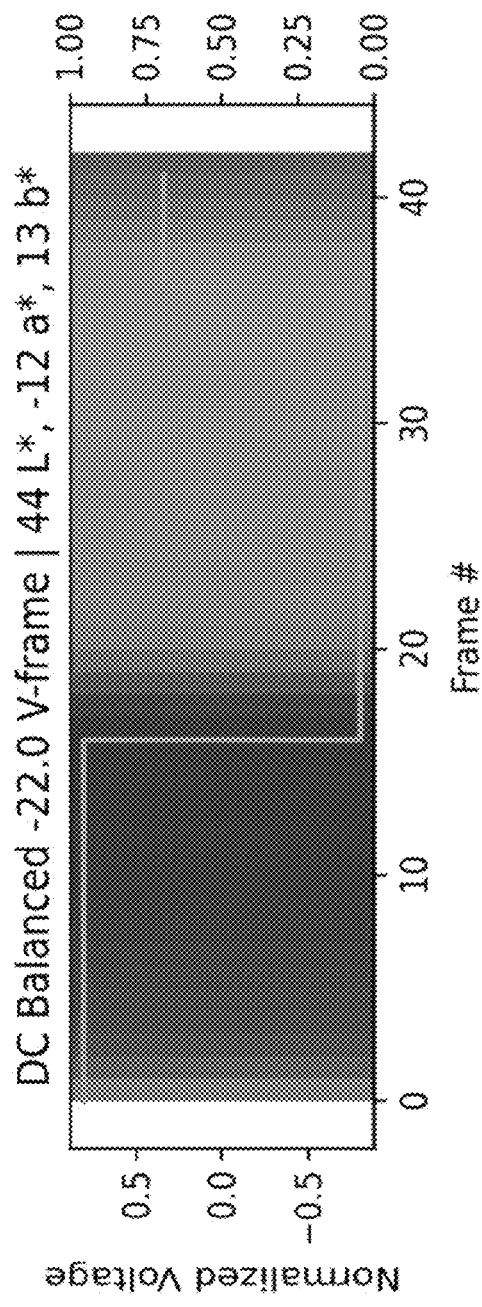
Figure 13A:
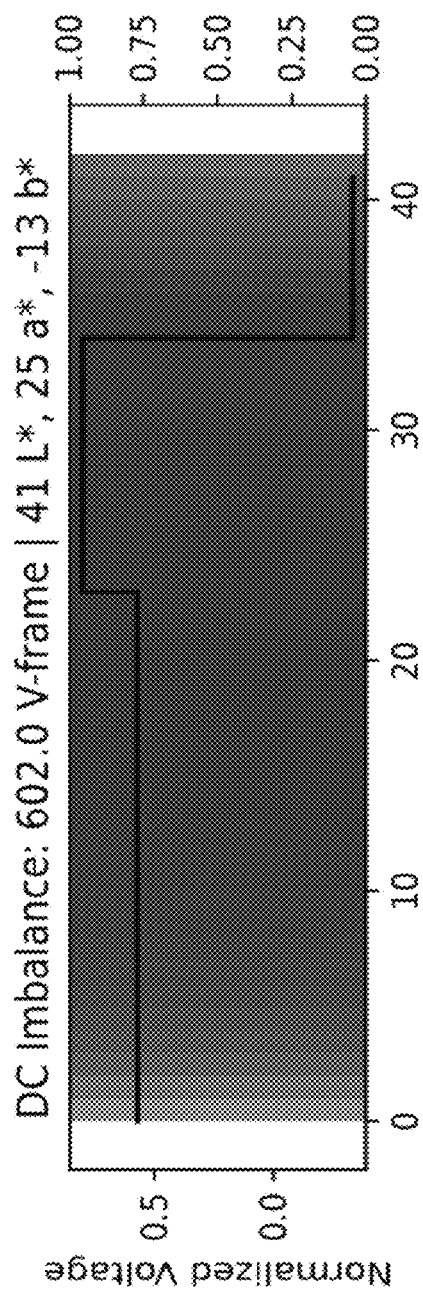
FIG. 13A and FIG. 13B compare calculated DC-imbalanced (FIG. 13A) and DC-balanced (FIG. 13B) waveforms to achieve a specific green color.
Figure 13B:
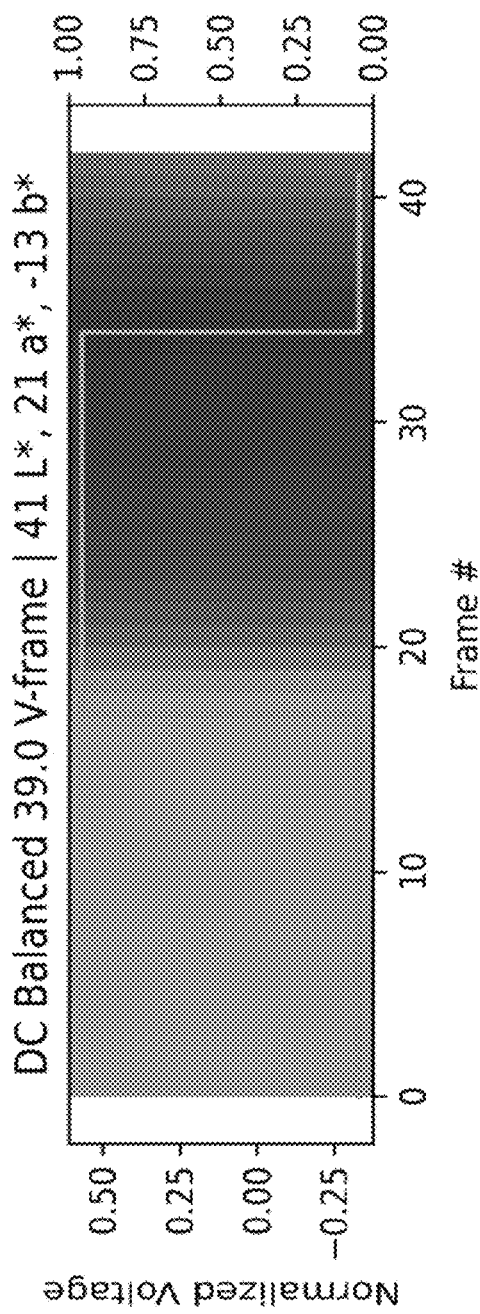

The methods described above were used to construct a model function describing a metal oxide AM-TFT backplane and a four particle electrophoretic medium including one reflective (white) particle and three subtractive particles (cyan, magenta, and yellow). For a 42-frame waveform at 85 Hz (0.5 s) each 3-pulse EPP waveform was tested (a total of 206, 640 unique waveforms). Eight color targets were chosen corresponding to the colors of black, white, magenta, blue, cyan, green, yellow and red. The 10,000 waveforms with the closest final color state to each of these eight targets were chosen to be evaluated further. These 10,000 final color states points are plotted on an a*-b* plot in FIG. 10:

Interestingly, the methods herein provide greater insight when searching for other distinguishing features, such as ghosting or DC-balance. As shown in FIG. 11, it is possible to achieve many of the same color states using DC-balanced (triangles) or DC-imbalanced (circles) waveforms. Note the overlap between the DC-imbalanced EPP waveform (circle) and the DC-balanced EPP waveforms (triangle) at the representative color states in FIG. 11. However, looking at the actual waveforms, it is remarkable to see that, in some instances the DC-balanced and DC-imbalanced waveforms are quite similar in shape. Compare, for example FIGS. 12A and 12B, corresponding to the square in FIG. 11 and FIGS. 13A and 13B, corresponding to the star in FIG. 11. In the instance of FIGS. 12A and 12B, there is very little difference between the DC-balanced and DC-imbalanced waveforms, whereas in FIGS. 13A and 13B, the difference between the DC-balanced and DC-imbalanced waveforms is quite pronounced.

Figure 10:
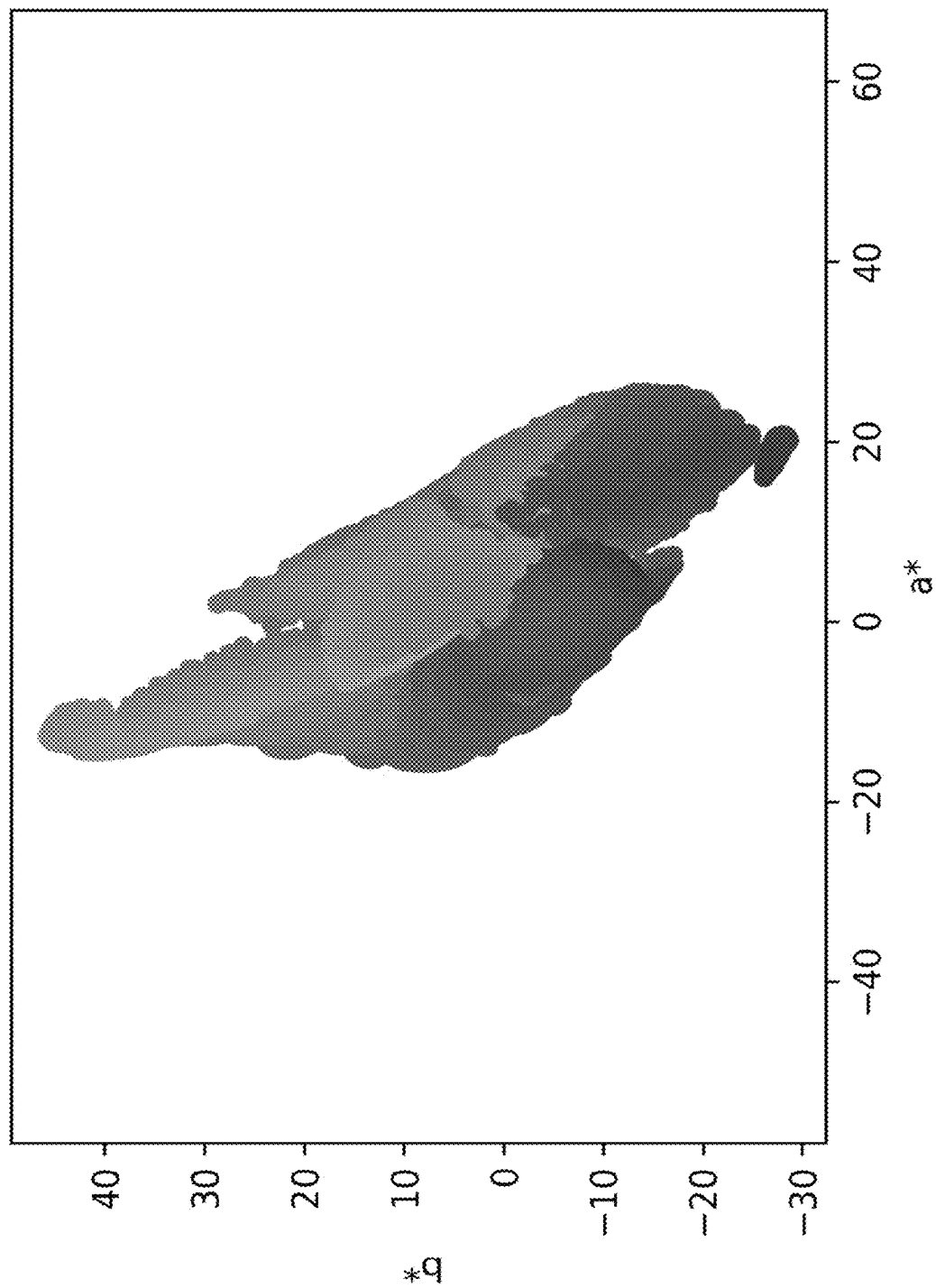
FIG. 10 shows 10,000 final color states achieved by enhanced push pull waveforms using a model of a metal oxide TFT backplane and a four particle ACeP-type electrophoretic medium.

It is notable in FIGS. 10 and 11, that the preferred target colors ("X"s in FIG. 11) may not be achievable in a given ACeP-type electrophoretic display build, using EPP waveforms. This phenomenon is reproduced in physical displays.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The invention claimed is:

1. A computer program product stored in a non-transitory memory for determining push-pull waveforms for driving an electrophoretic display, the computer program product containing a plurality of instructions which, when executed by a processor, cause the processor to:

estimate an optical state of the electrophoretic display produced by each of a plurality of candidate push-pull waveforms using a model representing the electrophoretic display, wherein the model includes a transfer function represented by $$O(t) = \tilde{f}(V(t), x(0))$$

where t is time, O(t) is the optical state of the electrophoretic display as a function of t, V(t) is the voltage applied to the electrophoretic display as a function of t, x(0) is an initial optical state of the electrophoretic display at t=0, and f is a function of V(t) and x(0); and select a push-pull waveform to produce a targeted optical state based on the estimated optical states produced by the candidate waveforms.

2. The computer program product of claim 1, further comprising instructions for evaluating the color output of the electrophoretic display and comparing the color output to the target color.

3. The computer program product of claim 1, further comprising instructions for using the color output and associated waveform as training data for the model.

4. The computer program product of claim 1, further comprising instructions for determining the set of candidate waveforms by:
    selecting a finite set of at least five different voltage levels for waveforms for driving the electrophoretic display;
    selecting a finite time width for the waveforms; and
    identifying a set of waveforms each having a positive portion and a negative portion, wherein each of the positive and negative portions comprises at least one pulse, and at least one of the positive and negative portions comprises two pulses having different voltage magnitudes each corresponding to one of the at least five different voltage levels, wherein a sum of pulse widths of the positive and negative portions equals the finite time width.

5. The computer program product of claim 4, wherein selecting the finite time width includes comparing a target color to a predicted output color.

6. The computer program product of claim 4, wherein the finite set of at least five different voltage levels includes a high negative voltage between −30V and −20V, a medium negative voltage between −20V and −2V, a medium positive voltage between 2V and 20V, and a high positive voltage between 20V and 30V.

7. The computer program product of claim 4, wherein the finite set of at least five different voltage levels includes −27V, 0V, and +27V.

8. The computer program product of claim 4, wherein the finite set of at least five different voltage levels includes seven voltage levels: a high negative voltage, a medium negative voltage, a low negative voltage, a zero voltage, a low positive voltage, a medium positive voltage, and a high positive voltage.

9. The computer program product of claim 1, further comprising instructions for determining the set of candidate waveforms by:
    selecting a finite set of voltages for driving the electrophoretic display, wherein the set of voltages includes at least five different voltage levels;
    selecting a finite time width of time for candidate waveforms; and
    calculating all waveforms having a first positive portion composed of a first pulse and a second pulse, the first pulse having a first positive magnitude and a first time width and the second pulse having a second positive magnitude and a second time width, and a second negative portion composed of a third pulse and a fourth pulse, the third pulse having a first negative magnitude and a third time width and the fourth pulse having a second negative magnitude and a fourth time width,
    wherein the first positive magnitude, the second positive magnitude, the first negative magnitude, and the second negative magnitude each have a value from the finite set of voltages, and
    wherein the sum of the first pulse width, the second pulse width, the third pulse width, and the fourth pulse width equals the finite time width.

10. The computer program product of claim 1, wherein the electrophoretic display comprises an electrophoretic medium disposed between a first light transmitting electrode and a second electrode, the electrophoretic medium including four sets of particles, wherein each particle set has a different optical characteristic and a different charge characteristic from other particle sets in the electrophoretic medium.

11. The computer program product of claim 10, wherein the four sets of particles comprises first, second, third, and fourth sets of particles, wherein said first set of particles is reflective and second, third, and fourth sets of particles are subtractive.

12. The computer program product of claim 11, wherein two of the four sets of particles are positively charged and two of the four sets of particles are negatively charged.

13. The computer program product of claim 11, wherein one of the four sets of particles is positively charged and three of the four sets of particles are negatively charged.

14. The computer program product of claim 11, wherein three of the four sets of particles are positively charged and one of the four sets of particles are negatively charged.

15. The computer program product of claim 1, wherein the model is a differentiable deep learning model based on a recurrent neural network architecture.

* * * * *